United States Patent
Ohira et al.

(10) Patent No.: US 8,295,603 B2
(45) Date of Patent: Oct. 23, 2012

(54) IMAGE PROCESSING APPARATUS, IMAGE FORMING APPARATUS, IMAGE PROCESSING SYSTEM, AND IMAGE PROCESSING METHOD

(75) Inventors: Masakazu Ohira, Nara (JP); Atsuhisa Morimoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1246 days.

(21) Appl. No.: 12/055,878

(22) Filed: Mar. 26, 2008

(65) Prior Publication Data

US 2008/0239350 A1 Oct. 2, 2008

(30) Foreign Application Priority Data

Mar. 28, 2007 (JP) ................................. 2007-085927
Feb. 18, 2008 (JP) ................................. 2008-036590

(51) Int. Cl.
G06K 9/46 (2006.01)
(52) U.S. Cl. .................... 382/190; 382/124; 382/209
(58) Field of Classification Search .................. 382/124, 382/190, 209; 386/46
See application file for complete search history.

(56) References Cited

U.S. PATENT DOCUMENTS

| 5,465,353 | A | 11/1995 | Hull et al. |
| 5,799,115 | A | 8/1998 | Asano et al. |
| 6,584,223 | B1 * | 6/2003 | Shiiyama ...................... 382/173 |
| 6,959,105 | B1 * | 10/2005 | Ishii et al. ..................... 382/124 |
| 7,240,219 | B2 * | 7/2007 | Teicher et al. ................ 713/193 |
| 7,561,743 | B2 * | 7/2009 | Mattausch et al. ............ 382/209 |
| 7,593,551 | B2 * | 9/2009 | Kamei .......................... 382/118 |
| 7,653,264 | B2 * | 1/2010 | Hero et al. .................... 382/294 |
| 7,711,158 | B2 * | 5/2010 | Ahn et al. ..................... 382/124 |
| 7,916,788 | B2 * | 3/2011 | Asano et al. ............. 375/240.14 |
| 2002/0054692 | A1 | 5/2002 | Suzuki et al. |
| 2004/0123113 | A1 * | 6/2004 | Mathiassen et al. .......... 713/185 |
| 2004/0197013 | A1 * | 10/2004 | Kamei .......................... 382/118 |
| 2006/0257027 | A1 * | 11/2006 | Hero et al. .................... 382/190 |
| 2006/0280427 | A1 * | 12/2006 | Snowdon et al. ............... 386/46 |
| 2008/0205756 | A1 * | 8/2008 | Kamata et al. ................ 382/173 |

FOREIGN PATENT DOCUMENTS

| JP | 5-110815 A | 4/1993 |
| JP | 6-62234 A | 3/1994 |
| JP | 7-282088 A | 10/1995 |
| JP | 8-255236 | 10/1996 |
| JP | 2001-218040 A | 8/2001 |
| JP | 2004-7814 A | 1/2004 |
| JP | 2004-201068 A | 7/2004 |
| JP | 2004-202737 A | 7/2004 |
| JP | 2007-049476 | 2/2007 |
| WO | WO-2006/092957 A1 | 9/2006 |

* cited by examiner

*Primary Examiner* — Gregory M Desire
(74) *Attorney, Agent, or Firm* — Birch, Stewart, Kolasch & Birch, LLP

(57) ABSTRACT

In an image processing apparatus for determining whether input image data is identical with image data of a reference image or not and performing a process according to the result of the determination, input image data whose similarity to a reference image is not less than a predetermined first threshold value or encoded image data obtained by encoding the input image data is stored in an access limitation storage section to which only a specific user is accessible. This allows an administrator to easily check whether the result of the determination is appropriate or not, without requiring a larger and more complex structure.

17 Claims, 22 Drawing Sheets

FIG. 4

| -3 | -2 | -1 | 1  | -1 | -2 | -3 |
|----|----|----|----|----|----|----|
| -2 | -2 | 1  | 4  | 1  | -2 | -2 |
| -1 | 1  | 8  | 15 | 8  | 1  | -1 |
| 1  | 5  | 16 | 25 | 16 | 5  | 1  |
| -1 | 1  | 8  | 15 | 8  | 1  | -1 |
| -2 | -2 | 1  | 4  | 1  | -2 | -2 |
| -3 | -2 | -1 | 1  | -1 | -2 | -3 |

FIG. 10 (a)

| HASH VALUE | INDEX INDICATIVE OF DOCUMENT |
|---|---|
| H1 | ID1 |
| H2 | ID1 |
| H3 | ID1、ID2 |
| H4 | ID1 |
| H5 | ID1 |
| H6 | ID1、ID2 |
| ⋮ | ⋮ |

FIG. 10 (b)

| HASH VALUE | INDEX INDICATIVE OF DOCUMENT |
|---|---|
| H1 | ID1、ID1 |
| H2 | ID1 |
| H3 | ID1、ID2 |
| H4 | ID1 |
| H6 | ID1、ID2 |
| ⋮ | ⋮ |

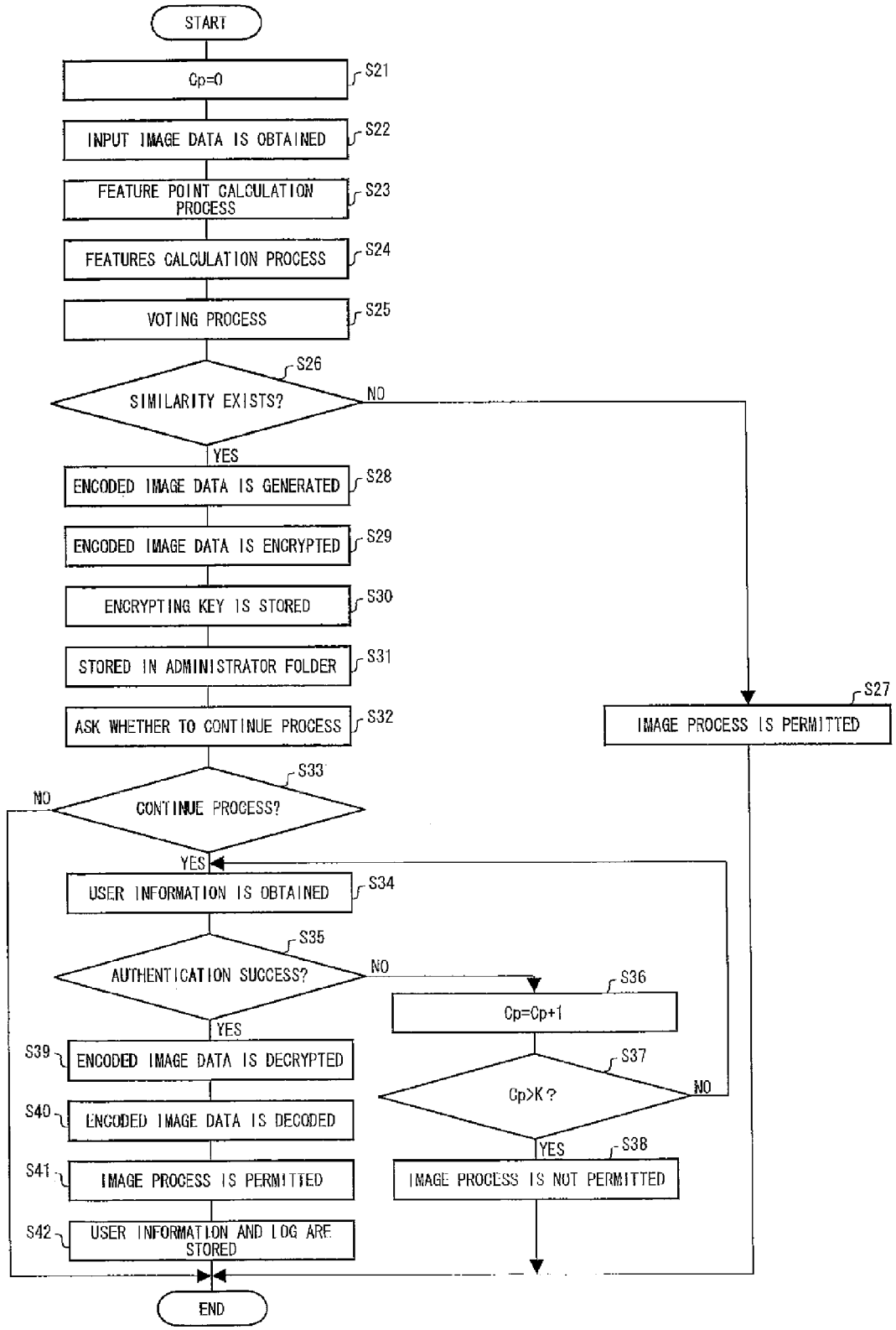

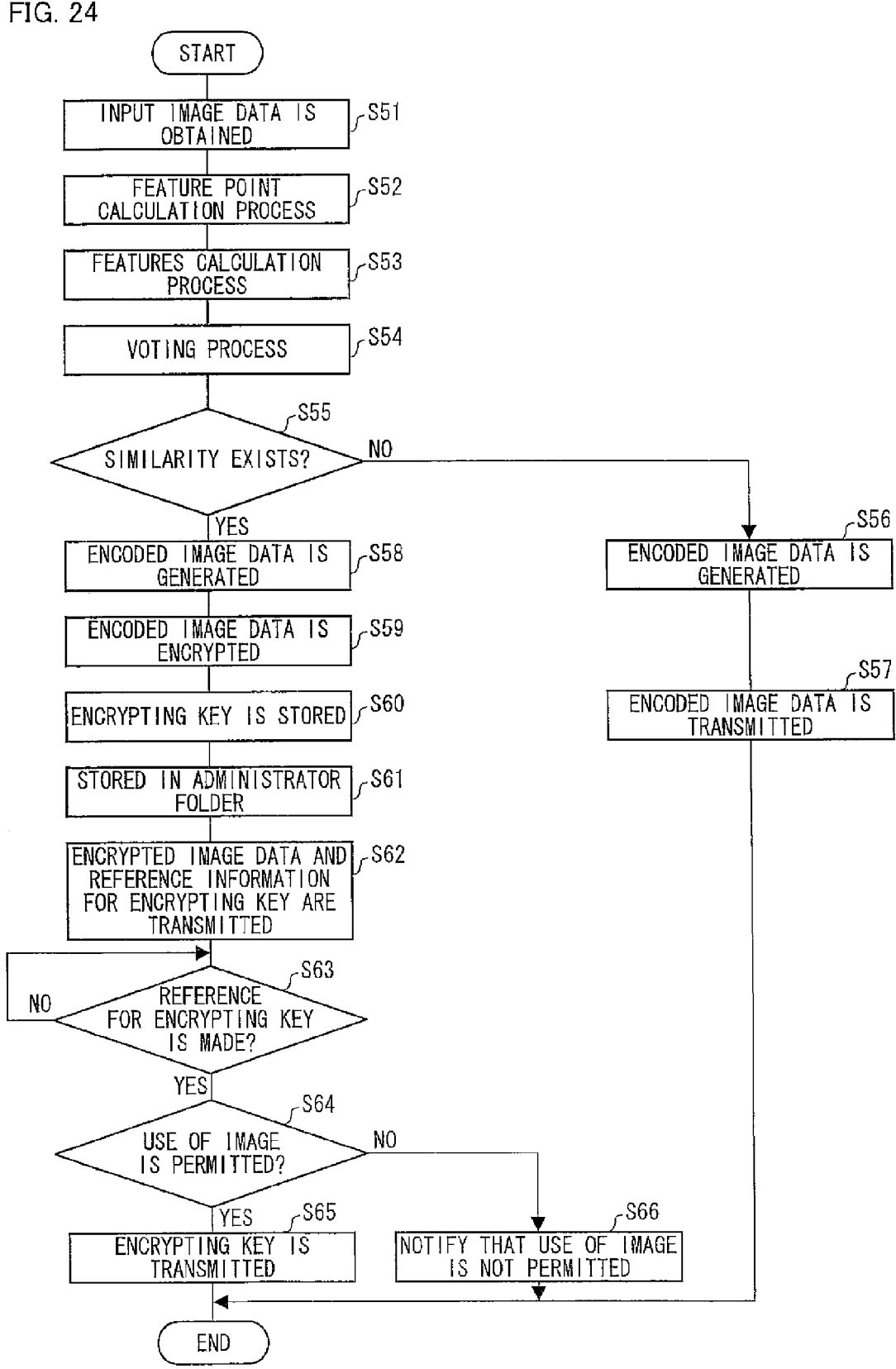

IMAGE PROCESSING APPARATUS, IMAGE FORMING APPARATUS, IMAGE PROCESSING SYSTEM, AND IMAGE PROCESSING METHOD

This non-provisional application claims priority under 35 U.S.C. §119(a) on Patent Application No. 2007-085927 filed in Japan on Mar. 28, 2007 and Patent Application No. 2008-036590 filed in Japan on Feb. 18, 2008, the entire contents of which are hereby incorporated by reference.

FIELD OF THE INVENTION

The present invention relates to an image processing apparatus, an image forming apparatus, an image processing system, and an image processing method, each of which allows similarity determination between input image data and pre-registered image data and allows a control according to the result of the similarity determination.

BACKGROUND OF THE INVENTION

There has been used a technique for comparing (i) input image data obtained by reading a document image with a scanner and (ii) a pre-registered image, so as to determine similarity between the input image data and the pre-registered image, and controlling a process (such as copy, transmission, and edition) to the input image data in accordance with the result of the determination.

Examples of a method for determining similarity include: a method in which a keyword is extracted from an image with OCR (Optical Character Reader) so as to carry out matching with the keyword; a method in which a target image is limited to an image with ruled lines and matching is carried out based on features of the ruled lines (see Patent Document 1 (Japanese Unexamined Patent Publication No. Tokukaihei 8-255236 (published on Oct. 1, 1996))); and a method in which similarity is determined based on distribution of color components of input image data and a reference image (see Patent Document 2 (Japanese Unexamined Patent Publication No. Tokukaihei 5-110815 (published on Apr. 30, 1993))). Furthermore, Patent Document 3 (Japanese Unexamined Patent Publication No. Tokukaihei 7-282088 (published on Oct. 27, 1995) discloses a technique in which a descriptor that is invariable to distortion caused by digitalization of an input document or to a difference between the input document and a matching document in a document database is generated based on characteristics of the input document, and matching between the input document and a document in the document database is performed using the descriptor and a descriptor database which stores descriptors and which indicates a list of documents including features from which descriptors are extracted. In the technique, when the descriptor database is scanned, votes for individual documents in the document database are accumulated, and a document with the largest number of votes obtained or a document whose number of votes obtained is over a certain threshold value is considered as a matching document.

Furthermore, Patent Document 4 (International Publication No. 2006/092957, pamphlet (published on Sep. 8, 2006) discloses a technique in which plural feature points are extracted from a digital image, a set of local feature points are determined out of the extracted feature points, a partial set of feature points is selected out of the determined set of local feature points, invariants relative to geometric transformation each as a value characterizing the selected partial set is calculated in accordance with plural combinations of feature points in the partial set, features are calculated by combining the calculated invariants, and a document or an image with the calculated features in a database is voted for, thereby searching a document or an image corresponding to the digital image.

Furthermore, an example of a technique for controlling a process for input image data in accordance with the result of similarity determination is as follows: in order to prevent forgery of paper currency or stock certificate by a color image forming apparatus, it is determined whether input image data is identical with image data such as paper currency or stock certificate (reference image) or not based on a pattern extracted from the input image data, and when the input image data is identical with the image data of the reference image, a specific pattern is given to an output image so as to specify the image forming apparatus that carries out copying, a copied image is daubed, or copying is prevented.

Furthermore, Patent Document 5 (Japanese Unexamined Patent Publication No. Tokukai 2004-202737 (published on Jul. 22, 2004)) discloses a technique in which, when it is determined that a specific image (or similar image) is included in a document, a predetermined error code is displayed on an operational section of a color copier, and a route for carrying a recording paper is switched so that the recording paper is output to a paper output tray having a covered lock mechanism. In the technique, when a formed image is not a specific document, a service person calls on a customer, unlocks the lock mechanism with use of a predetermined key card or a password, and takes out the recording paper inside the lock mechanism.

In the image processing apparatus for determining whether input image data is identical with image data of a reference image or not, limitation of accuracy in reading an image etc. may result in erroneous determination depending on conditions under which the image is read. For that reason, in a case where input image data that is not identical with image data of a reference image is wrongly determined as being image data of the reference image, in order to carry out a process for the input image data, it is necessary for an administrator (specific user; a specific person authorized to judge whether the result of similarity determination is appropriate or not, such as a person in charge of security in a corporation etc.) to confirm that the determination is an error and to make an operation to allow the process for the input image data.

However, out of the conventional techniques, in the technique for daubing a copied image, preventing copy, or giving a specific pattern to an output image when it is determined that input image data is identical with image data of the reference image, the input image data or a recording paper on which an image is formed according to the input image data is not stored. Consequently, it is impossible to confirm whether the result of the determination is appropriate or not afterward.

Furthermore, the technique of Patent Document 5 requires a paper output tray having a covered lock mechanism and a switching mechanism for switching between routes for carrying a recording paper, which requires an apparatus with a larger and more complex structure, and an increase in costs for the apparatus.

Furthermore, in a case where the result of the determination is appropriate, i.e., in a case where input image data is identical with data of a reference image whose copy is prohibited, a resource such as a printing paper, a toner or ink consumed in printing input image data, and electricity necessary for image formation is wasted, resulting in an increase in running costs.

Furthermore, the technique of Patent Document 5 is applicable to only an arrangement in which an image corresponding to input image data is formed on a recording paper, and is not applicable to an apparatus for transmitting (e.g. electronic distribution and facsimile transmission) or filing image data.

Furthermore, in the technique of Patent Document 5, whether the result of the determination is appropriate or not cannot be judged until a service person calls on a customer, unlocks the lock mechanism, takes out a recording paper on which a copied image is formed, and confirms the recording paper. Consequently, in the case where the input image data is not identical with image data of a reference image, it is impossible to obtain the recording paper on which the image is formed until the service person comes and confirms the recording paper, which is very inconvenient for a user. In addition, it is very troublesome for the service person because the service person must move to a place where the copier is installed, unlock the lock mechanism, and judge whether the result of the determination is appropriate or not.

SUMMARY OF THE INVENTION

The present invention was made in view of the foregoing problems. An object of the present invention is to provide an image processing apparatus for determining whether input image data is identical with image data of a reference image or not and performing a process in accordance with a result of the determination, the image processing apparatus allowing an administrator to easily judge whether the result of the determination is appropriate or not, without requiring a larger and more complex structure.

In order to solve the foregoing problem, the image processing apparatus of the present invention is an image processing apparatus, including: an input data obtaining section for obtaining input image data; a features extracting section for extracting features of the input image data; at least one of a storage section in which features of a reference image are stored and a reference image obtaining section for obtaining features of a reference image from an external device communicably connected with the image processing apparatus; a similarity calculation section for comparing the features of the input image data with the features of the reference image so as to calculate similarity between the input image data and the reference image; and a control section for controlling a process on the input image data in accordance with the similarity, the control section causing the input image data or encoded image data obtained by encoding the input image data to be stored in an access limitation storage section to which only a specific user is accessible, in a case where the similarity calculated by the similarity calculation section is not less than a predetermined first threshold value. The input data obtaining section may acquire input image data by a scanner reading a document, may acquire input image data generated by entering necessary information in a format of electronic data with use of software, may acquire input image data directly generated as electronic data, and may acquire input image data transmitted from a device communicably connected with the image processing apparatus.

With the arrangement, the image processing apparatus of the present invention includes at least one of the storage section in which features of a reference image are stored and the reference image obtaining section for obtaining features of a reference image from an external device communicably connected with the image processing apparatus. The features extracting section extracts the features of input image data, and the similarity calculation section compares the features of the reference image read out from the storage section or the features of the reference image obtained by the reference image obtaining section with the features of the input image data extracted by the features extracting section so as to calculate similarity between the reference image and the input image data. In the case where the similarity calculated by the similarity calculation section is not less than the predetermined first threshold value, the control section causes the input image data or encoded image data obtained by encoding the input image data to be stored in the access limitation storage section to which a specific user is accessible.

Thus, the input image data whose similarity to the reference image is not less than the first threshold value or the encoded image data thereof is stored in the access limitation storage section. Consequently, the specific user can easily check whether a result of similarity determination is appropriate or not by seeing the input image data or the encoded image data stored in the access limitation storage section. Furthermore, since only the control section and the access limitation storage section are required, it is unnecessary to provide a paper output tray having a covered lock mechanism and a switching mechanism for switching carrying routes of a recording paper that are described in Patent Document 5. Therefore, it is possible to realize an apparatus that allows a user to easily check whether the result of the similarity determination is appropriate or not, without requiring a larger and more complex structure and an increase in costs. Furthermore, the present invention is applicable not only to an arrangement in which an image corresponding to input image data is formed on a printing material but also to an arrangement in which input image data is electronically distributed, facsimiled, or filed etc.

The image forming apparatus of the present invention includes: the image processing apparatus; and an image output section for forming an image corresponding to input image data on a printing material.

With the image forming apparatus, the input image data whose similarity to the reference image is not less than the first threshold value or encoded image data thereof is stored in the access limitation storage section. Consequently, the specific user can easily check whether a result of the similarity determination is appropriate or not by seeing the input image data or the encoded image data stored in the access limitation storage section.

The image processing method of the present invention is an image processing method, including the steps of: (i) obtaining input image data; (ii) extracting features of the input image data; (iii) obtaining features of a reference image; and (iv) comparing the features of the input image data with the features of the reference image so as to calculate similarity between the input image data and the reference image, a process on the input image data being controlled in accordance with the similarity, the image processing method further including the steps of: (v) determining whether the similarity calculated in the step (iv) is not less than a predetermined first threshold value or not; and (vi) causing the input image data or encoded image data obtained by encoding the input image data to be stored in an access limitation storage section to which only a specific user is accessible, in a case where it is determined in the step (v) that the similarity is not less than the first threshold value.

With the method, the features of the input image data that are obtained in the step (i) are extracted in the step (ii), and the features of the reference image are obtained in the step (iii). Furthermore, the features of the input image data are compared with the features of the reference image in the step (iv) so as to calculate similarity between the input image data and the reference image. Subsequently, it is determined in the step (v) whether the similarity calculated in the step (iv) is not less than the predetermined first threshold value or not in the step (v). In a case where it is determined in the step (v) that the similarity is not less than the first threshold value, the input image data or the encoded image data obtained by encoding the input image data is stored in the access limitation storage section to which only a specific user is accessible in the step (vi).

Consequently, the input image data whose similarity to the reference image is not less than the first threshold value or the encoded image data thereof is stored in the access limitation storage section. Therefore, the specific user can check whether a result of the similarity determination is appropriate or not by seeing the input image data or the encoded image data stored in the access limitation storage section.

In order to solve the foregoing problem, the image processing system of the present invention is an image processing system, including an image processing apparatus and a server communicably connected with the image processing apparatus, one or both of the image processing apparatus and the server including: an input data obtaining section for obtaining input image data; a features extracting section for extracting features of the input image data; a storage section in which features of a reference image are stored; a similarity calculation section for comparing the features of the input image data with the features of the reference image so as to calculate similarity between the input image data and the reference image; a control section for controlling a process on the input image data in accordance with the similarity; and an access limitation storage section to which only a specific use is accessible, in a case where the similarity calculated by the similarity calculation section is not less than a predetermined first threshold value, the control section causing the input image data or encoded image data obtained by encoding the input image data to be stored in the access limitation storage section.

With the arrangement, the input image data whose similarity to the reference image is not less than the first threshold value or the encoded image data thereof is stored in the access limitation storage section. Consequently, the specific user can easily check whether a result of similarity determination is appropriate or not by seeing the input image data or the encoded image data stored in the access limitation storage section. Furthermore, since only the control section and the access limitation storage section are required, it is unnecessary to provide a paper output tray having a covered lock mechanism and a switching mechanism for switching carrying routes of a recording paper that are described in Patent Document 5. Therefore, it is possible to realize an apparatus that allows a user to easily check whether the result of the similarity determination is appropriate or not, without requiring a larger and more complex structure and an increase in costs. Furthermore, the present invention is applicable not only to an arrangement in which an image corresponding to input image data is formed on a printing material but also to an arrangement in which input image data is electronically distributed, facsimiled, or filed etc.

For a fuller understanding of the nature and advantages of the invention, reference should be made to the ensuing detailed description taken in conjunction with the accompanying drawings.

BRIEF DESCRIPTION OF THE DRAWINGS

FIG. 4 is an explanatory drawing illustrating an example of filter coefficients for a mixing filter included in an MTF process section of the image processing apparatus in FIG. 2.

FIGS. 10($a$) and 10($b$) are explanatory drawings each illustrating an example of a hash value regarding a feature point stored in a hash table and an index indicative of input image data.

FIG. 23 is a flowchart illustrating a flow of an image output process in the image processing apparatus in FIG. 22.

FIG. 24 is a flowchart illustrating a flow of an image transmission process in the image processing apparatus in FIG. 22.

DESCRIPTION OF THE EMBODIMENTS

Embodiment 1

An embodiment of the present invention is explained below. Explained in this embodiment is a case where the present invention is applied to a digital color multi-function printer (MFP).

(1-1. Arrangement of Digital Color Multi-Function Printer 1)

Figure 2:
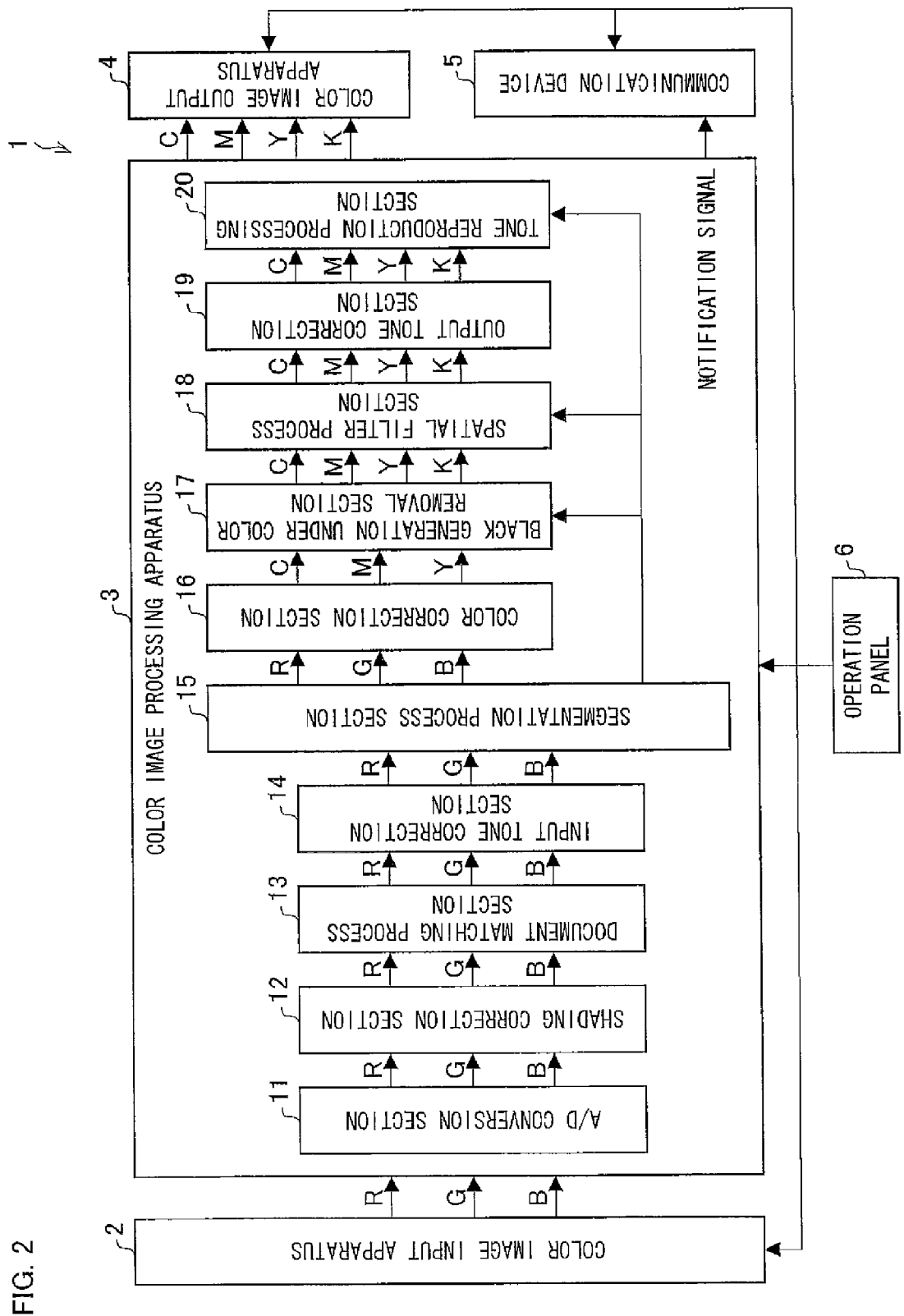
FIG. 2 is a block diagram schematically illustrating a structure of an image processing apparatus in accordance with an embodiment of the present invention.

FIG. 2 is a block diagram schematically illustrating an arrangement of a digital color multi-function printer (image processing apparatus, image forming apparatus, image scanning apparatus) 1 according to the present embodiment. The digital color multi-function printer 1 has a copying function, a printing function, a facsimile-sending function, a scanning function, a scan-to-E-mail function, and the like.

As illustrated in FIG. 2, the digital color multi-function printer 1 includes a color image input apparatus 2, a color image processing apparatus 3, a color image output apparatus 4, a communication device 5, and an operation panel 6.

The color image input apparatus (image scanning apparatus) 2 is, for example, composed of a scanner (not shown) including a CCD (Charge Coupled Device) for converting optical information into an electric signal. The color image input apparatus 2 reads an optical image reflected from an original document as RGB (R: Red, G: Green, B: Blue) analog signals and supplies the RGB analog signals to the color image processing apparatus 3.

The color image processing apparatus 3 includes an A/D converter 11, a shading correction section 12, a document matching process section 13, an input tone correction section 14, a segmentation process section 15, a color correction section 16, a black generation under color removal section 17, a spatial filter process section 18, an output tone correction section 19, and a tone reproduction process section 20. The analog signals read by the color image input apparatus 2 are transmitted to the A/D converter 11, the shading correction section 12, the document matching process section 13, the input tone correction section 14, the segmentation process section 15, the color correction section 16, the black generation under color removal section 17, the spatial filter process section 18, the output tone correction section 19, and the tone reproduction process section 20 in this order in the color image processing apparatus 3. Ultimately, the analog signals are outputted to the color image output apparatus 4 as CMYK digital color signals.

The A/D (Analog/Digital) converter 11 converts the RGB analog signals into RGB digital signals.

The shading correction section 12 removes various distortions produced in an illumination system, an image focusing system, and an image sensing system of the color image input apparatus 2 from the RGB digital signals transmitted from the A/D converter 11. Moreover, the shading correction section 12 adjusts color balance of the RGB digital signals and converts each signal into a signal such as a density (pixel value) signal which can be processed easily by an image processing system used in the color image processing apparatus 3.

The document matching process section 13 gives determination on similarity between input image data and a reference image (determines whether there is any similarity or not). Further, the document matching process section 13 outputs the inputted RGB signals to the subsequent input tone correction section 14 without any modification. Note that, the document matching process section 13 will be detailed later.

The input tone correction section 14 removes background color (density component of the background: background density) from the RGB signals whose various distortions have been removed by the shading correction section 12, and adjusts image quality such as contrast.

The segmentation process section 15 separates each pixel of an input image into either one of a text region, a halftone dot region, or a photograph (continuous tone) region, according to the RGB signals. On the basis of a result of the separation, the segmentation process section 15 outputs a segmentation class signal, indicating which region a pixel of the input image belongs to, to the color correction section 16, the black generation under color removal section 17, the spatial filter process section 18, and the tone reproduction process section 20. The segmentation process section 15 also outputs the input signal as received from the input tone correction section 14 to the subsequent color correction section 16 without any modification.

The color correction section 16 removes color impurity on the basis of spectral characteristics of CMY (C: Cyan, M: Magenta, and Y: Yellow) color materials including an unnecessarily absorption component, in order to realize a faithful color reproduction.

The black generation under color removal section 17 performs (i) black generation processing for generating a black (K) signal from three color (CMY) signals after the color correction processing and (ii) generation processing of new CMY signals by removing the K signal obtained by the black generation processing from the original CMY signals. As a result, the three CMY signals are converted into four CMYK signals.

With the use of a digital filter, the spatial filter process section 18 performs a spatial filter processing on the basis of a segmentation class signal, with respect to the image data which is received in the form of the CMYK signals from the black generation under color removal section 17. In the spatial filter processing, the spatial filter process section 18 corrects a space frequency characteristic, so as to reduce blur or granularity deterioration in an output image. The tone reproduction process section 20, as with the spatial filter process section 18, performs a predetermined process with respect to the image data in the form of the CMYK signals, on the basis of the segmentation class signal.

For example, in the region separated into a text region by the segmentation process section 15, the spatial filter process section 18 strongly emphasizes a high frequency component in an edge enhancement process of the spatial filter process, in order to improve reproducibility of a black text or a color text especially. Concurrently, the tone reproduction process section 20 selects either binary processing or multi-level dithering on a high-resolution screen suitable for reproducing the high frequency component.

In the region separated into a halftone dot region by the segmentation process section 15, the spatial filter process section 18 performs a low pass filter processing for removing an input halftone dot component. The output tone correction section 19 performs the output tone correction processing in which a signal such as a density signal is converted into a halftone dot area rate that is characteristics of the color image output apparatus 4. Subsequently, the tone reproduction process section 20 performs the tone reproduction processing (half tone generation) so that, ultimately, an image is segmented into pixels and each tone of the pixels can be reproduced. In the region separated into a photograph region by the segmentation process section 15, the binary processing or the multi-value processing is performed on a screen suitable for tone reproduction.

The image data which has been subjected to each of the processing mentioned above is temporarily stored in a storage device (not shown). The image data is read from the storage device at a predetermined timing and supplied to the color image output apparatus 4.

The color image output apparatus 4 outputs the image data supplied from the color image processing apparatus 3 to a printing medium such as paper. The color image output apparatus 4 is not particularly limited and may be a color image output apparatus which uses an electrophotographic method or an ink-jet method.

The communication device 5 is composed of a modem or a network card for example. The communication device 5 communicates with other device connected to a network (e.g., a personal computer, a server device, other digital multi-function printer, a facsimile device, and the like) via a network card, a LAN cable, and the like.

Note that, in case of transmitting image data, the communication device 5 carries out a transmission procedure to secure a state where transmission can be performed, and then reads out, from a memory, the image data encoded in a predetermined format (image data scanned by a scanner) and carries out necessary processing such as change of the encoding format so as to sequentially transmit the image data via a communication line.

Further, in case of receiving image data, the communication device 5 carries out a communication procedure and receives the image data from a transmission end so as to input the image data to the color image processing apparatus 3. The received image data is subjected to a predetermined process such as a decoding process, a rotation process, a resolution conversion process, output tone correction, and a tone reproduction process by the color image processing apparatus 3, and the image data processed is outputted by the color image output apparatus 4. Note that, the present invention may be arranged so that the received image data is stored in a storage device (not shown) and the stored image data is read out by the color image processing apparatus 3 as necessary so as to be subjected to the aforementioned processing.

The operation panel 6 includes, for example, a display section (not shown) such as a liquid crystal display and setting buttons (not shown). The operation panel 6 causes the display section to display information corresponding to an instruction of a main control section (not shown) of the digital color multi-function printer 1 and transmits information, inputted by the user with use of the setting buttons, to the main control section. The user can input, via the operation panel 6, a processing request (e.g., a processing mode (copy, printing, transmission, editing and the like), the number of images to be processed (the number of images to be copied, the number of images to be printed), a destination of input image data, and the like) with respect to the image data. The main control section is composed of a CPU (Central Processing Unit) and the like for example. In accordance with a program or various data stored in a ROM (not shown) or the like and information which is entered via the operation panel 6, the main control section controls each operation of each section of the digital color multi-function printer 1.

(1-2 Document Matching Process Section 13)

Next explained is the document matching process section 13 in detail. The document matching process section 13 according to the present embodiment extracts plural feature points from the input image data, determines a set of local feature points relative to each of the extracted feature points, selects a partial set of feature points out of the determined set of local feature points, calculates invariants each of which is relative to geometric transformation as a value characterizing the selected partial set in accordance with plural combinations of feature points in the partial set, calculates a hash value by combining the calculated invariants, and votes for a reference image corresponding to the hash value, thereby retrieving a reference image similar to the input image data and carrying out a similarity determination process (whether there is any similarity or not) with respect to the reference image.

Figure 1:
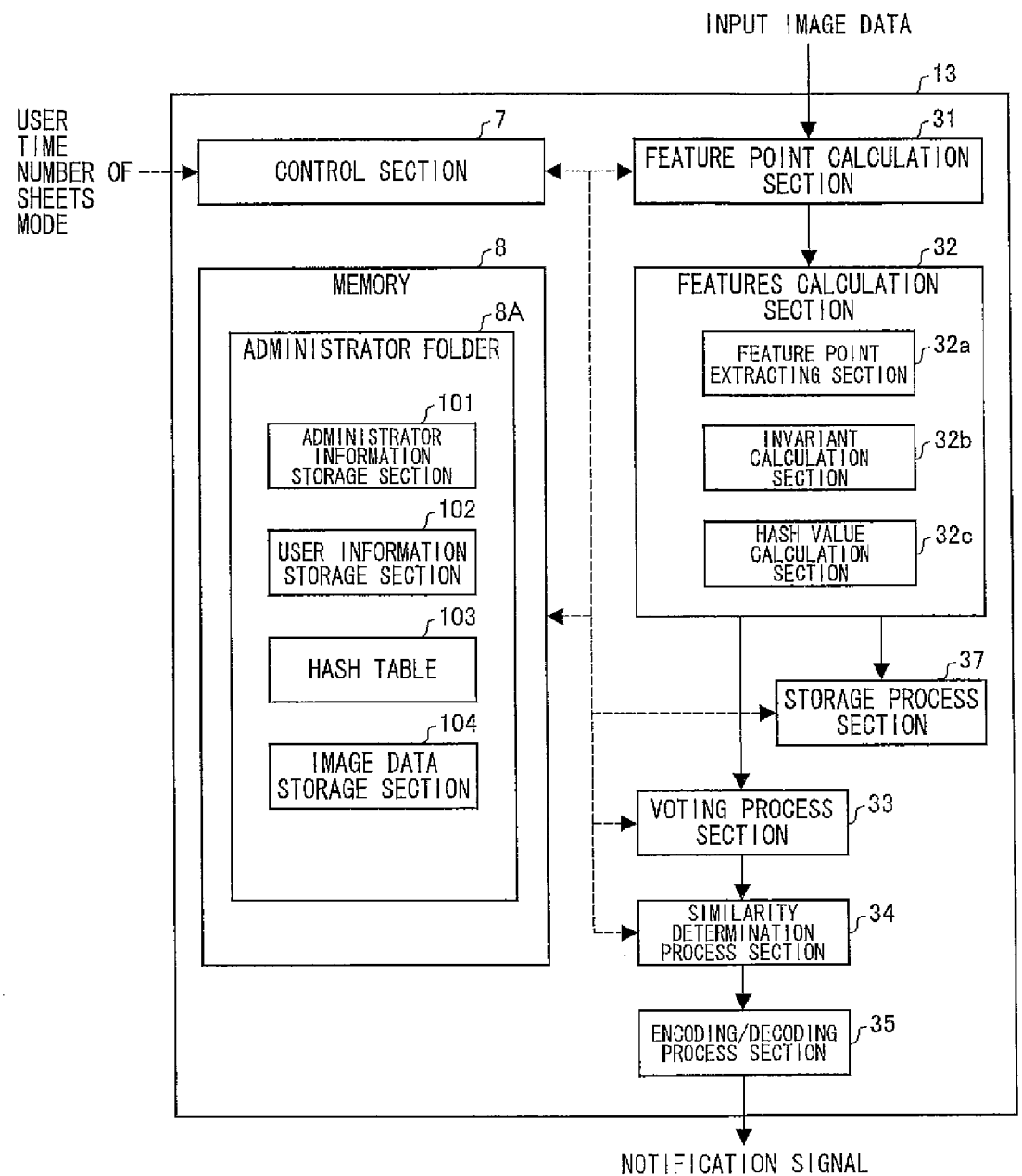
FIG. 1 is a block diagram schematically illustrating a structure of a document matching process section included in an image processing apparatus in accordance with an embodiment of the present invention.

FIG. 1 is a block diagram schematically illustrating an arrangement of the document matching process section 13. As illustrated in FIG. 1, the document matching process section 13 includes a feature point calculation section 31, a features (feature vectors) calculation section 32, a voting process section 33, a similarity determination process section 34, an encoding/decoding process section 35, a storage process section 37, a control section 7, and a memory section 8.

The control section 7 controls operations of the sections of the document matching process section 13. Note that, the control section 7 may be provided in the main control section for controlling operations of the sections of the digital color multi-function printer 1 or may be provided separately from the main control section so as to cooperate with the main control section in controlling operations of the document matching process section 13.

Further, in case where it is determined that there is no similarity (input image data is not identical with image data of a reference image) as a result of the similarity determination of the document matching process section 13, the control section 7 allows image processing to be carried out with respect to the input image data. Further, in case where it is determined that there is similarity (the input image data is identical with image data of the reference image), the control section 7 stores the input image data (or encoded image data obtained by encoding the input image data) in the administrator folder 8A included in the memory 8. Further, in case where it is determined that there is similarity, the control section 7 asks the user whether to continue image processing (such as copying, printing, transmission, editing, etc.) or not. When the user requests continuation of the image processing, the control section 7 performs a user authentication to check whether the user is permitted to continue the image processing. In a case of authentication success, the control section 7 stores user information and a log(operation recording information, such as document ID of input image data, user ID of a user having entered process request, date when the process request was entered, contents of the process request (process mode, number of sheets to be processed, destination, contents of editing, etc.), similarity, user information (user ID, password, etc.)) in the administrator folder 8A and permits the image processing to be performed. However, the present invention is not limited to this. For example, the present invention may be arranged so that, in a case where it is determined that similarity exists, the control section 7 prohibits the input image data from being processed, and stores the input image data (or encoded image data obtained by encoding the input image data) in the administrator folder 8A included in the memory 8.

The memory 8 stores therein various data, a processing result, and the like, which are used in the processing of each section of the document matching process section 13. Further, the memory 8 includes the administrator folder 8A, i.e., a folder (storage region) which can be seen and edited only by an administrator (person who is registered beforehand and is authorized to judge whether the result of similarity determination is appropriate or not and to permit input image data to be processed when the determination that similarity exists is wrong; e.g., a security administrator or a similar person in an corporation or a shop).

The administrator folder 8A internally includes an administrator information storage section 101, a user information storage section 102, a hash table 103, an image data storage section (similar image data storage section) 104, and the like.

The administrator information storage section 101 stores therein information for specifying an administrator allowed to see and edit the administrator folder 8A. In case where the administrator folder 8A is requested to be seen and edited, the control section 7 performs an authentication process with reference to the administrator information storage section 101 so as to determine whether or not to allow the user to see and edit the administrator folder 8A. Note that, how to authenticate the administrator is not particularly limited, and various conventionally known authentication methods can be adopted. Further, in the present embodiment, the administrator sends information, required in authentication, to the digital color multi-function printer 1 from an external device (computer, server device, and the like) connected to the digital color multi-function printer 1 in a communicable manner, thereby carrying out the authentication. However, the authentication is not limited to this. For example, the authentication may be carried out via the operation panel 6 of the digital color multi-function printer 1.

The user information storage section 102 stores user information regarding a user allowed to continue image processing at a time when it is determined that similarity exists (input image data is identical with image data of a reference image) and when the user requests continuation of the image processing on the input image data. When the user requests continuation of the image processing, the control section 7 refers to the user information stored in the user information storage section 102 and performs authentication process of the user. A method for authenticating a user is not particularly limited and may be one of various publicly known authentication methods.

The hash table 103 is a table in which characteristic quantities of the reference images are stored. The hash table 103 will be detailed later.

The image data storage section 104 is a storage section in which input image data (or encoded image data obtained by encoding the input image data) is stored in a case where it is determined that similarity exists (input image data is identical with image data of a reference image) and a user requests continuation of the image processing on the input image data and the control section 7 permits continuation of the image processing as a result of user authentication.

The feature point calculation section 31 extracts a connected component of a text or a ruled line and performs calculation with a centroid of the connected component used as a feature point. However, the arrangement of the feature point calculation section 31 is not limited to this, and the feature point may be calculated in accordance with various conventionally known methods for example.

Figure 3:
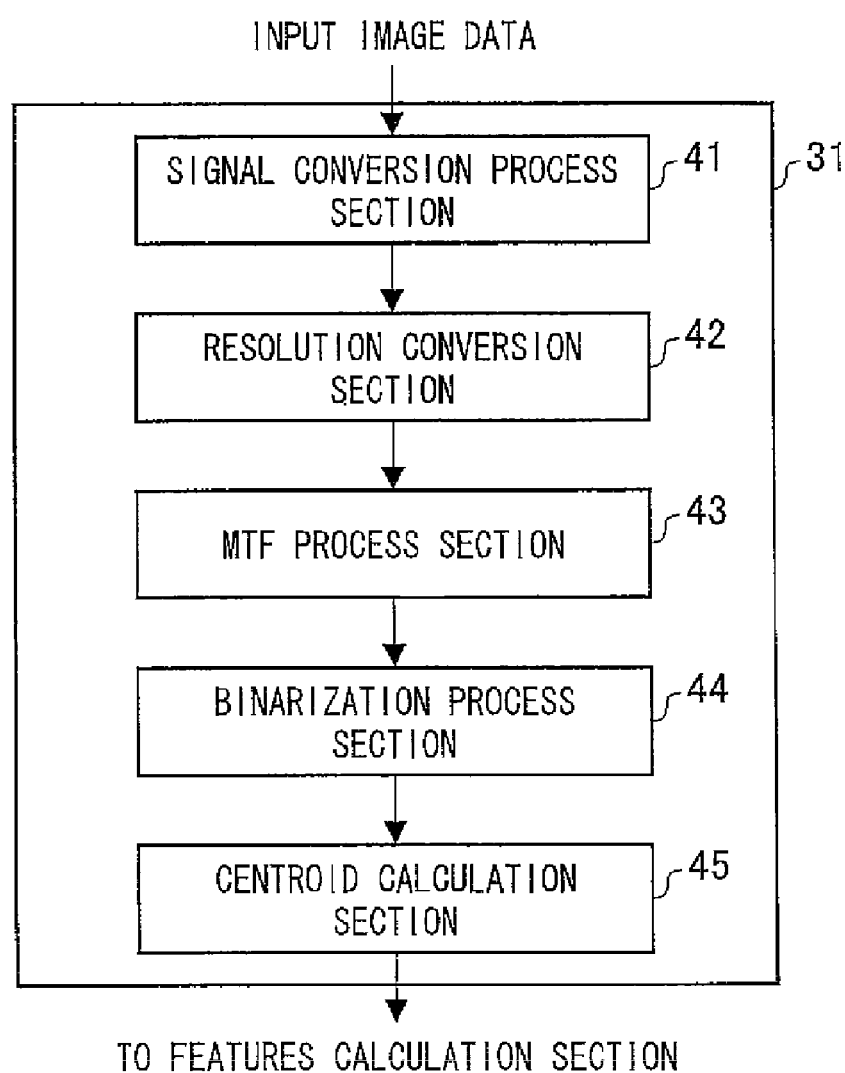
FIG. 3 is a block diagram schematically illustrating a structure of a feature point calculation section included in the image processing apparatus in FIG. 2.

FIG. 3 is a block diagram schematically illustrating an arrangement of the feature point calculation section 31. As illustrated in FIG. 3, the feature point calculation section 31 includes an signal conversion process section 41, a resolution conversion section 42, an MTF process section 43, a binarization process section 44, and a centroid calculation section 45.

In case where image data (KGB signals) inputted from the shading correction section 12 is a color image, the signal conversion process section 41 achromatizes the image data and converts the achromatized image data into a lightness signal or a luminance signal.

For example, the signal conversion process section 41 converts the RGB signals into a luminance signal Y in accordance with the following expression (1).

$$Yi = 0.30Ri + 0.59Gi + 0.11Bi \quad (1)$$

"Y" refers to a luminance signal of each pixel, and each of K, G, and B is a color component of the RGB signals, and "i" subsequently added to "Y", "R", "G", and "B" represents a value given to each pixel (i is an integer not less than 1).

Alternatively, the RGB signals may be converted into CIE1976L*a*b* signal (CIE: Commission International de l' Eclairage, L*: lightness, a*, b*: chromaticity).

The resolution conversion section 42 scales up/down the input image data. For example, in case where the input image data is optically scaled up/down by the image input device 2, the resolution conversion section 42 scales up/down the input image data again so as to have a predetermined resolution. Further, in order to reduce processes carried out by the subsequent process sections, the resolution conversion section 42 may convert resolution so as to make the resolution lower than a resolution in being scanned by the image input device 2 at an equal scale factor (for example, image data scanned at 600 dpi (dot per inch) is converted into data of 300 dpi or a similar operation is carried out).

The MTF (modulation transfer function) process section 43 is used to cover (adjust) unevenness of spatial frequency characteristics among a plurality of color image input apparatuses 2. In the image signal outputted from the CCD, MTF deterioration occurs due to an optical component such as a lens or a mirror, an aperture in a light receiving surface of the CCD, transfer efficiency or afterimage, storage effect or scanning unevenness caused by physical scanning, and a similar cause. The MFT deterioration causes the scanned image to blur. The MTF process section 43 carries out an appropriate filtering process (emphasizing process) so as to recover the blur caused by the MTF deterioration. Further, the MTF process section 43 is used also to suppress an unnecessary high frequency component in extracting feature points by the subsequent centroid calculation section 45. That is, a mixing filter (not shown) is used to carry out an emphasizing process and a smoothing process. Note that, FIG. 4 illustrates an example of a filter coefficient of the mixing filter.

The binarization process section 44 compares achromatized image data (luminance value (luminance signal) or lightness value (lightness signal)) with a preset threshold value so as to binarize the image data.

Figure 5:
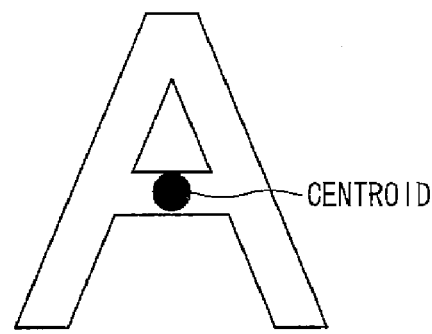
FIG. 5 is an explanatory drawing illustrating examples of a connected component extracted by the feature point calculation section in the image processing apparatus in FIG. 2 from input image data and a centroid of the connected component.
Figure 6:
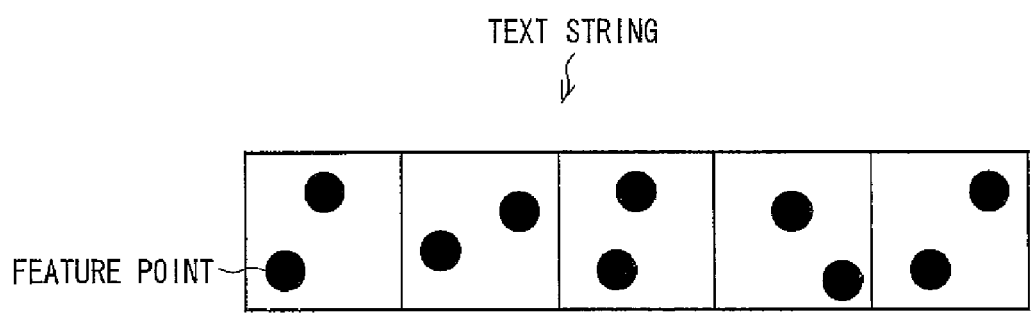
FIG. 6 is an explanatory drawing illustrating an example of centroids (feature points) of connected components extracted from a text sequence in input image data by the feature point calculation section in the image processing apparatus in FIG. 2.

The centroid calculation section 45 carries out labeling (labeling process) with respect to each pixel in accordance with the image data binarized by the binarization process section 44 (for example, the binarized data is represented by "1" or "0"). Further, a connected component between pixels having the same label is specified and a centroid of the specified connected component is extracted as a feature point. Further, the extracted feature point is outputted to the features calculation section 32. FIG. 5 is an explanatory drawing illustrating the connected component extracted from the input image data and a centroid of the connected component as an example. In this figure, the connected component corresponding to a character "A" and the centroid thereof are illustrated. Further, FIG. 6 is an explanatory drawing illustrating an example of centroids (feature points) of plural connected components extracted from a text sequence included in the input image data. Note that, the feature point can be expressed by coordinate values (x coordinate, y coordinate) of a binary image.

The features calculation section 32 includes a feature point extraction section 32a, an invariant calculation section 32b, and a hash value calculation section 32c. A feature point calculated by the feature point calculation section 31 is used to calculate features (hash value and/or invariant) which are invariable relative to geometric transformation such as rotation, parallel shift, scaling up, scaling down, and the like of a document image.

Figure 7:
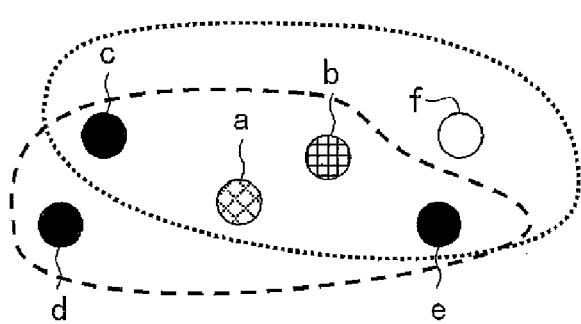
FIG. 7 is an explanatory drawing illustrating examples of a target feature point and a peripheral feature point that are extracted at a time when the features calculation section in the image processing apparatus in FIG. 2 calculates features.

As illustrated in FIG. 7, the feature point extraction section 32a regards only one feature point as a target feature point and sequentially extracts peripheral feature points around the target feature point in such order that a feature point nearer to the target feature point is more preferentially extracted so as to extract a predetermined number of feature points (four feature points herein). In FIG. 7, four feature points b, c, d, and e are extracted as peripheral feature points in case where a feature point a is regarded as a target feature point, and four feature points a, c, e, and f are extracted as peripheral feature points in case where a feature point b is regarded as a target feature point.

Figure 8:
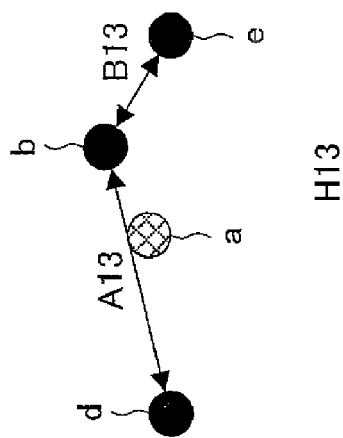
FIGS. 8($a$) to 8($c$) are explanatory drawings each illustrating an example of a combination of a target feature point and a peripheral feature point that are extracted at a time when the features calculation section in the image processing apparatus in FIG. 2 calculates features.
Figure 8:
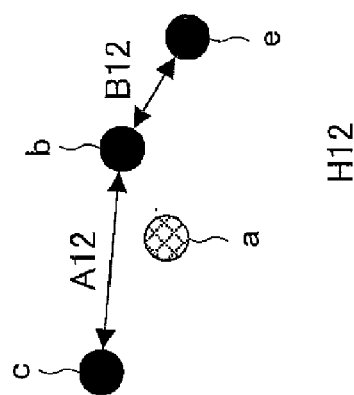
Figure 8:
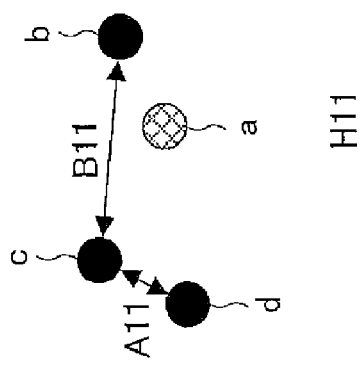

Further, the feature point extraction section 32a extracts a combination of three points which can be selected from the four peripheral feature points extracted in the foregoing manner. For example, as illustrated in FIGS. 8(a) to 8(c), in case where a feature point a is regarded as a target feature point, a combination of three feature points b, c, d, and C, that is, a combination of peripheral feature points b, c, and d, a combination of peripheral feature points b, c, and e, and a combination of peripheral feature points b, d, and C are extracted.

Next, the invariant calculation section 32b calculates an invariant (one of characteristic quantities) Hij of the extracted combination relative to geometrical transformation. Herein, "i" represents the number of target feature point(s) (i is an integer not less than 1), and "i" represents the number of combinations of three peripheral feature points (j is an integer not less than 1). In the present embodiment, a ratio of lengths of two lines connecting the peripheral characteristics is set as the invariant Hij. Note that, the lengths of the lines are calculated in accordance with coordinates of the peripheral characteristics. For example, in FIG. 8(a), when a length of a line connecting the feature point c and the feature point d is A11 and a length of a line connecting the feature point c and the feature point b is B11, the invariant H11 is such that H11=A11/B11. Further, in FIG. 8(b), when a length of a line connecting the feature point c and the feature point b is A12 and a length of a line connecting the feature point b and the feature point e is B12, the invariant H12 is such that H12=A12/B12. Further, in FIG. 8(c), when a length of a line connecting the feature point d and the feature point b is A13 and a length of a line connecting the feature point b and the feature point e is B13, the invariant H13 is such that H13=A13/B13. In this manner, the invariants H11, H12, and H13 are calculated in the examples illustrated in FIGS. 8(a) to 8(c). Note that, in the foregoing examples, a line connecting a peripheral feature point positioned at the left side in the horizontal direction and a peripheral feature point positioned at the center in the horizontal direction is indicated as Aij and a line connecting a peripheral feature point positioned at the center in the horizontal direction and a peripheral feature point positioned at the right side in the horizontal direction is indicated as Bij, but the definition is not limited to this, and the lines used to calculate the invariant Hij may be set in any manner.

Next, the hash value calculation section 32c calculates a remainder of $(Hi1 \times 10^2 + Hi2 \times 10^1 + Hi3 \times 10^0)/D$ as a hash value (one of characteristic quantities) Hi and stores the calculated Hi into the memory 8. Note that, D is a constant number which is set beforehand according to a range which is to be set as a remainder value range.

Note that, how to calculate the invariant Hij is not particularly limited. For example, a value calculated in accordance with a compound ratio of five points in the vicinity of the target feature point, or a value calculated in accordance with a compound ratio of five points extracted from n points in the vicinity of the target feature point (n is such an integer that n≧5), or a value calculated in accordance with an arrangement of m points extracted from n points in the vicinity of the target feature point (m is such an integer that m<n and m≧5) and a compound ratio of five points extracted from the m points may be set as the invariant Hij relative to the target feature point. Note that, the compound ratio is a value calculated from four points in a straight line or from five points on a plane and is known as an invariant relative to projective transformation which is a kind of geometric transformation.

Further, an expression for calculating the hash value Hi is not limited to the foregoing expression (2), and other hash function (for example, any one of hash functions mentioned in Patent Document 4) may be used.

Further, when extraction of peripheral feature points around a target feature point and calculation of the hash value Hi are completed, each section of the features calculation section 32 focuses on another feature point to change the target feature point and performs extraction of peripheral feature points and calculation of a hash value. In this manner, each section of the features calculation section 32 calculates hash values corresponding to all the feature points.

Figure 9:
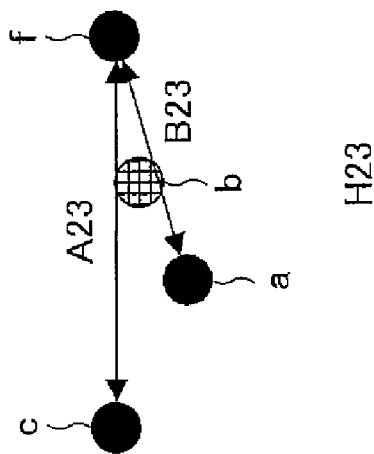
FIGS. 9($a$) to 9($c$) are explanatory drawings each illustrating an example of a combination of a target feature point and a peripheral feature point that are extracted at a time when the features calculation section in the image processing apparatus in FIG. 2 calculates features.
Figure 9:
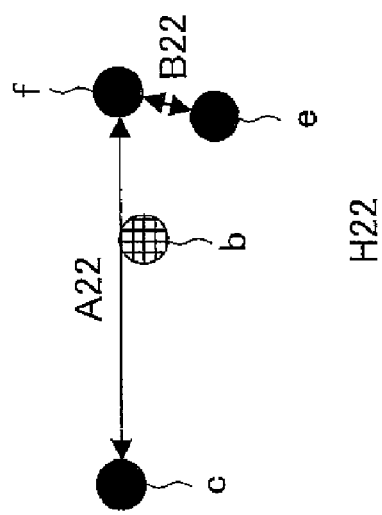
Figure 9:
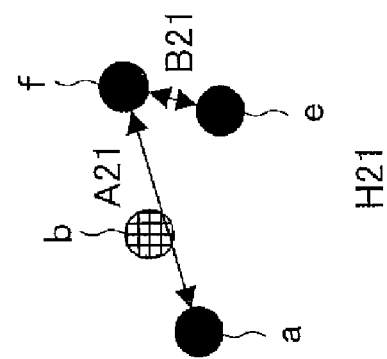

In FIG. 7, when extraction of peripheral feature points around a feature point a regarded as a target feature point and calculation of a hash value are completed, peripheral feature points around a feature point b regarded as a target feature point are extracted and a hash value is calculated. In FIG. 7, four feature points a, c, e, and f are extracted as peripheral feature points in case where the feature point b is regarded as a target feature point. Further, as illustrated in FIGS. 9(a) to 9(c), a combination of three points (peripheral feature points a, e, and f, peripheral feature points c, e, and f, peripheral feature points a, c, and f) selected from the peripheral feature points a, c, C, and f is extracted and a hash value corresponding to the combination is calculated, and the calculated hash value is stored in the memory 8. Further, this process is repeated so as to correspond to the number of the feature points, thereby calculating hash values corresponding to the respective feature points each of which is regarded as the target feature point. Then, the calculated hash values are stored in the memory 8.

Note that, how to calculate the invariant when the feature point a is regarded as the target feature point is not limited to the aforementioned manner. For example, it may be so arranged that: as illustrated in FIG. 20(a) to FIG. 20(d), in case where the feature point a illustrated in FIG. 7 is regarded as the target feature point, a combination of three points out of peripheral feature points b, c, d, and e, that is, a combination of peripheral feature points b, c, and d, a combination of peripheral feature points b, c, and C, a combination of peripheral feature points b, d, and e, and a combination of peripheral feature points c, d, and e are extracted, and an invariant (one of characteristic quantities) Hij relative to geometric transformation is calculated with respect to each of the extracted combinations.

Further, it may be so arranged that: in case where the feature point b illustrated in FIG. 7 is regarded as the target feature point, as illustrated in FIGS. 21(a) to 21(d), a combination of three points (peripheral feature points a, e, and f, peripheral feature points a, c, and e, peripheral feature points a, f, and c, peripheral feature points e, f, and c) is extracted from four feature points a, c, e, and f, and an invariant Hij relative to geometric transformation is calculated with respect to each combination. Note that, in this case, a remainder of $(Hi1 \times 10^3 + Hi2 \times 10^2 + Hi3 \times 10^1 + Hi4 \times 10^0)/D$ is calculated as a hash value, and the calculated hash value is stored in the memory 8.

Further, in the aforementioned example, a line connecting a peripheral feature point nearest to the target feature point and a peripheral feature point secondarily nearest to the target feature point is Aij and a line connecting the peripheral feature point nearest to the target feature point and a peripheral feature point thirdly nearest to the target feature point is Bij, but the definition is not limited to this. The lines used to calculate the invariant Hij may be set in any manner as in such a manner that the lines are set in accordance with a length of each of lines connecting the peripheral feature points.

Note that, in case of registering the input image data as a reference image, the features calculation section 32 transmits the hash value (features) calculated in the foregoing manner and corresponding to each characteristic of the input image data to the storage process section 37.

The storage process section 37 sequentially registers (i) hash values calculated by the features calculation section 32 and corresponding to the respective feature points and (ii) indices (document IDs) each indicative of a document (input image data) to the hash table 103 provided in the memory 8 (see FIG. 10(a)). In case where the hash values have already been stored, the document IDs are stored with them respectively corresponding to the hash values. Document IDs are serially assigned to respective documents without any duplication. Note that, in case where the number of documents stored in the hash table 103 is larger than a predetermined value (for example, 80% of the number of documents which can be stored), old document IDs may be searched and sequentially deleted. Further, the deleted document IDs may be reused as document IDs of new input image data. Further, in case where the calculated hash values are identical with each other (H1=H5 in FIG. 10(b)), these values may be collectively stored into the hash table 103.

Further, in case of determining whether the input image data is identical with image data of an image having been already stored (similarity determination process), the features calculation section 32 transmits, to the voting process section 33, the hash value calculated in the foregoing manner and corresponding to each feature point.

Figure 11:
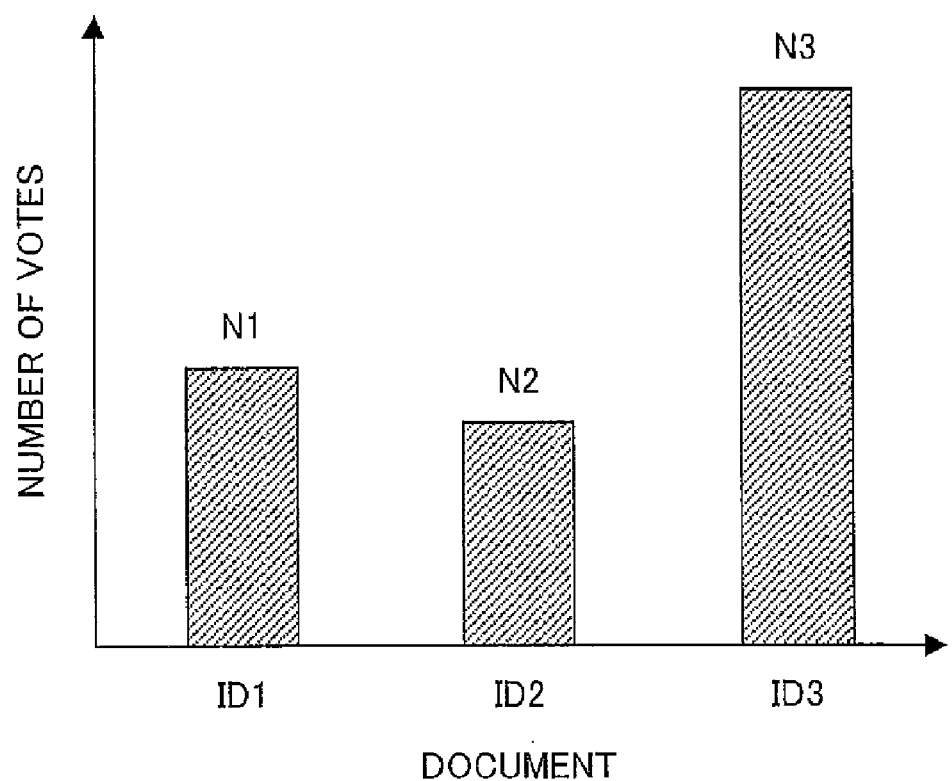
FIG. 11 is a graph showing an example of the number of votes for each reference image in a voting process section of the image processing apparatus in FIG. 2

The voting process section 33 compares the hash value calculated from the input image data and corresponding to each feature point with the hash value stored in the hash table 103 so as to vote for a reference image having the same hash value. In other words, there is counted the number of times the same hash value as a hash value of the reference image is calculated from the input image data for each reference image, and the counted number is stored in the memory 8. FIG. 11 is a graph illustrating an example of the number of votes for reference images ID1, ID2, and ID3.

The similarity determination process section 34 reads out a vote result of the voting process section 33 (an index of each reference image and the number of votes for each reference image: similarity) from the memory 8, and extracts the maximum number of votes obtained and an index of a reference image with the maximum number of votes obtained. Further, the similarity determination process section 34 compares the maximum number of votes obtained with a predetermined threshold value (second threshold value) TH2 so as to determine whether there is any similarity or not (whether the input image data is identical with image data of the reference image or not), and sends a determination signal indicative of the determination result to the control section 7. That is, in case where the maximum number of votes obtained is not less than the predetermined threshold value TH2, it is determined that "there is similarity (the input image data is identical with image data of the reference image)", and in case where the maximum number of votes is less than the threshold value TH2, it is determined that "there is no similarity (the input image data is not identical with image data of the reference image)".

Alternatively, it may be so arranged that: the similarity determination process section 34 divides the number of votes obtained for each reference image by a total number of votes (total number of feature points extracted from the input image data) and normalizes the result so as to calculate the similarity, thereby comparing the similarity with the predetermined threshold value TH2 (80% of the number of total votes for example) to determine the similarity.

Further, it may be so arranged that: the similarity determination process section 34 divides the number of votes obtained for each reference image by the number of times of storage of a hash value (maximum number of times a hash value is stored) corresponding to a reference image whose hash value is most frequently stored and normalizes the result so as to calculate the similarity, thereby comparing the similarity with the predetermined threshold value TH2 (80% of the number of total votes for example) to determine the similarity. That is, in case where the calculated similarity is not less than a threshold value TH2, it is determined that 'there is similarity', and in case where the calculated similarity is less than the threshold value TH2, it is determined that "there is no similarity". Note that, in this case, the total number of hash values extracted from the input image data may be larger than the maximum number of times of storage of a hash value (particularly, a case where the document and/or the reference image partially has a handwritten part), so that the calculated value of the similarity may exceed 100%.

Further, the threshold value TH2 in determining the similarity may be constant for each reference image or may be set for each reference image in accordance with importance or the like of the reference image. As to the importance of the reference image, for example, a paper currency, a valuable stock certificate, a top-secret document, a restricted document, and the like are regarded as having maximum importance, and a secret document is regarded as being less important than a paper current or the like. In this manner, the importance may be set by stages according to each reference image. In this case, a weighting coefficient according to importance of a reference image is stored in the memory 8 with the weighting coefficient corresponding to an index of the reference image, and the similarity determination process section 34 determines the similarity by using the threshold value TH2 corresponding to the reference image with the maximum number of votes obtained.

Further, it may be so arranged that: in determining the similarity, the threshold value TH2 is made constant and the number of votes for each reference image (the number of votes obtained for each reference image) is multiplied by a weighting coefficient of each reference image so as to determine the similarity. In this case, the weighting coefficient according to the importance of each reference image is stored in the memory 8 with the weighting coefficient corresponding to an index of each reference image, and the similarity determination process section 34 calculates a corrected number of obtained votes by multiplying the number of obtained votes of each reference image by the weighting coefficient of the reference image, thereby determining the similarity in accordance with the corrected number of obtained votes. For example, a maximum corrected number of obtained votes may be compared with the threshold value TH2, or a value obtained by normalizing the maximum corrected number of obtained votes by the number of total votes may be compared with the threshold value TH2, or a value obtained by normalizing the maximum corrected number of obtained votes by the maximum number of times of storage may be compared with the threshold value TH2. Further, in this case, for example, the weighting coefficient is set to be more than 1 and to be larger as the importance of the reference image is higher.

Further, in the present embodiment, a single hash value is calculated for a single feature point (target feature point), but the present invention is not limited to this, and it may be so arranged that a plurality of hash values are calculated for a single feature point (target feature point). For example, it may be so arranged that: six points are extracted as peripheral feature points around the target feature point, and three points are extracted from five points for each of six combinations obtained by extracting five points from the six points, so as to calculate an invariant, thereby calculating a hash value. In this case, six hash values are calculated for a single feature point.

The encoding/decoding process section 35 encodes input image data so as to generate encoded image data, and decodes the encoded image data so as to restore the input image data. A method for encoding is not particularly limited. Examples of the method include JPEG (Joint Photographic Experts Group) and TIFF (Tagged Image File Format).

(1-3. Process of Digital Color Multi-Function Printer)

Figure 12:
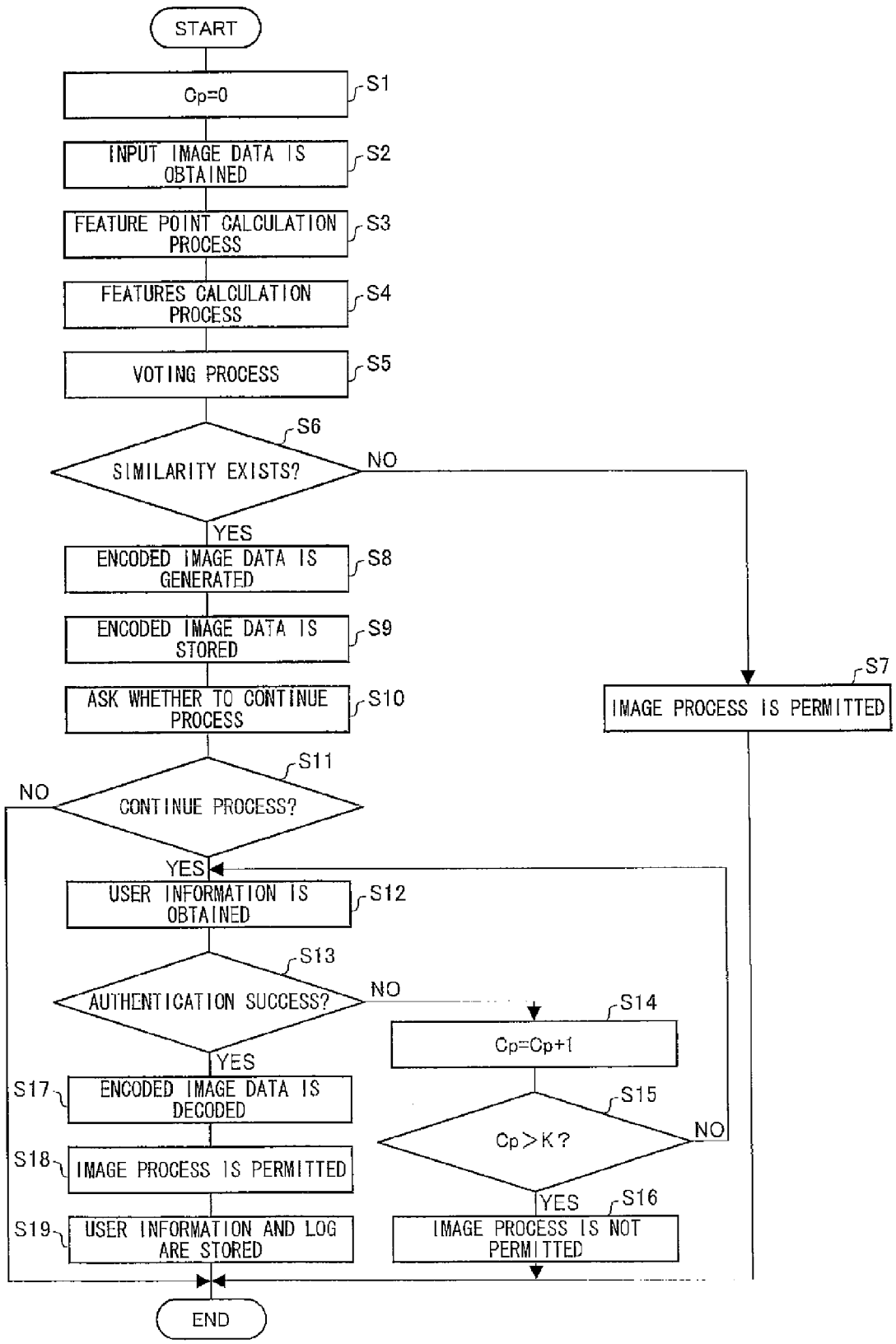
FIG. 12 is a flowchart illustrating a flow of a process in the image processing apparatus in FIG. 2.

The following explains a process of a digital color multi-function printer 1 with reference to a flowchart of FIG. 12. In the following explanation, administrator information is stored in the administrator information storage section 101 in advance and user information is stored in the user information storage section 102 in advance. In a case of adding, editing, etc. these information, an administrator performs an authentication process, accesses an administrator folder 8A, and performs an addition and/or editing of the information appropriately. Furthermore, a preset value for number-of-times K (e.g. K=5) reentry of user information is accepted is stored in the user information storage section 102 in advance.

Initially, when the control section 7 receives an instruction input (image process request) from a user via the operation panel 6 or the communication device 5, the control section 7 resets number-of-times Cp user information to be stored in the memory 8 is input (Cp=0) (S1).

Next, the control section 7 acquires input image data (S2). For example, the control section 7 may acquire input image data by the color image input apparatus 2 reading a document image, or by the communication device 5 obtaining input image data from an external device, or by reading input image data from various storage media via a card reader (not shown) included in the digital color multi-function printer 1.

Next, the control section 7 controls sections of the document matching process section 13 so that the sections carry out a feature point calculation process (S3), a features calculation process (S4), a voting process (S5), and a similarity determination process (S6).

In a case where it is determined that no similarity exists as a result of the similarity determination process, the control section 7 permits an image process according to a process request from the user (S7), and finishes the process.

On the other hand, in a case where it is determined that similarity exists as a result of the similarity determination process, the control section 7 causes the encoding/decoding process section 35 to encode input image data and generate encoded image data (S8), and stores the encoded image data thus generated in the image data storage section 104 in the administrator folder 8A (S9). In the present embodiment, the encoded image data is stored. Alternatively, input image data may be stored without encoding. A method for storing image data will be explained later.

Furthermore, the control section 7 causes the display section of the operation panel 6 to display a message that an image process requested by the user is not permitted and a question whether the user requests continuation of the image process or not (S10). At that time, the display section may display a message that continuation of the image process requires user authentication and that user information and a log are recorded (alternatively, user information and a log are notified to an administrator (notification signal in FIG. 1 is output)).

Next, the control section 7 judges whether the user requests continuation of the image process or not according to user's input via the operation panel 6 (S11). When the control section 7 judges that the user does not request continuation of the image process, the control section 7 finishes the process.

On the other hand, when the control section 7 judges that the user requests continuation of the image process, the control section 7 causes the display section of the operation panel 6 to display a message for urging the user to enter user information (user ID and password), and acquires user information entered by the user (S82). Here, an explanation is made as to a case where the user enters the user ID and the password as the user information via the operation panel 6. However, the present invention is not limited to this case and may be arranged so that the control section 7 reads out user information from a personal card inserted into a card reader (not shown) included in the digital color multi-function printer 1. Furthermore, the present invention may be arranged so that, when a process request comes from an external device (such as computer) communicably connected with the digital color multi-function printer 1, the control section 7 transmits, to the external device, a signal for requesting transmission of user information and acquires the user information sent from the external device.

Next, the control section 7 compares the obtained user information with user information stored in the user information storage section 102, and performs an authentication process for judging whether the user is permitted to continue the image process or not (S13).

When the obtained user information does not match user information stored in the user information storage section 102 (authentication failure), the control section 7 increments the value of Cp by 1 (Cp=Cp+1) (S14), and judges whether Cp>K or not (S15). When Cp>K, the control section 7 does not permit continuation of the image process (S16), and finishes the process. On the other hand, when Cp≦K, the control section 7 causes the process to go back to S12 and accepts input of the user information again.

When the user information obtained in S13 matches the user information stored in the user information storage section 102 (authentication success), the control section 7 decodes encoded image data stored in the image data storage section 104 (S17), permits continuation of the image process (S18), stores the input image data (or encoded image data) and a log regarding the input image data in the administrator folder 8A (S19), and finishes the process. At that time, the control section 7 may notify, via the communication device 5, a predetermined receiving end that the image process has been performed for the input image data determined as having similarity. Alternatively, the control section 7 may transmit, via the communication device 5, the input image data (or encoded image data) and the log to a predetermined receiving end. Alternatively, the present invention may be arranged so that the user ID is superposed on a part of the input image data and when the input image data is displayed, printed (image formation) etc., the user ID is displayed on a part of an output image. Alternatively, the present invention may be arranged so that, when a process request comes from an external device (such as computer) communicably connected with the digital color multi-function printer 1 and when encoded image data is stored in the image data storage section 104 in the administrator folder 8A (when data is not output at the time the user comes to the digital color multi-function printer 1), the control section 7 causes the display section to display a message that continuation of the image process requires user authentication and user information and a log are recorded, and thereafter a job is selected and output in response to user authentication success. A method for storing input image data (or encoded image data) and a log will be mentioned later.

(1-4. Method for Storing Image Data, User Information, and Log)

Figure 13:
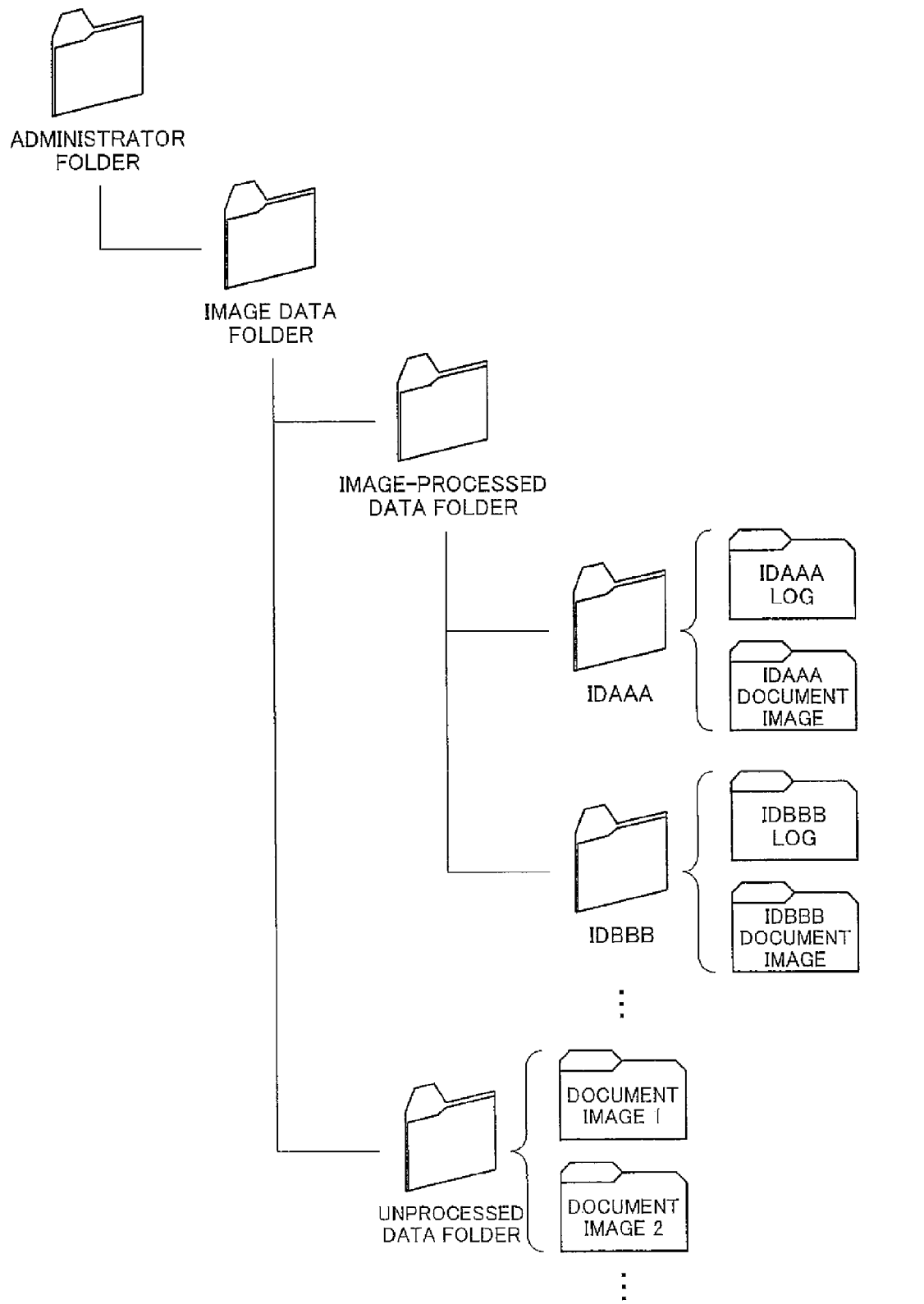
FIG. 13 is an explanatory drawing illustrating an example of a hierarchical structure of an administrator folder 8A in the image processing apparatus in FIG. 2.

The following explains a method for storing image data, user information, and a log. FIG. 13 is an explanatory drawing illustrating a hierarchical structure in the administrator folder 8A. As illustrated in FIG. 13, the administrator folder 8A includes the image data storage section (image data folder) 104. An image-processed data folder and an unprocessed data folder are provided in a lower hierarchy of the image data storage section 104.

When storing encoded image data in the image data storage section 104 in the process of S9, the control section 7 stores the encoded image data in the unprocessed data folder. At that time, the control section 7 assigns a file name based on a document ID to the encoded image data.

Furthermore, when storing input image data (or encoded image data) and a log in the image data storage section 104 in the process of S19, the control section 7 stores the input image data (or the encoded image data) and the log in the image-processed data folder. Specifically, the control section 7 generates a user folder for each user in a lower hierarchy of the image-processed data folder, and stores the input image data (or the encoded image data) and the log in the user folder corresponding to user information. At that time, as illustrated in FIG. 13, the control section 7 may change the file name of the image data to be stored and the file name of the log to be stored into file names corresponding to the user information (file names including user ID) and store the image data and the log. Alternatively, the control section 7 may insert user ID (user information) into a header part of the image data or the log to be stored.

Figure 14:
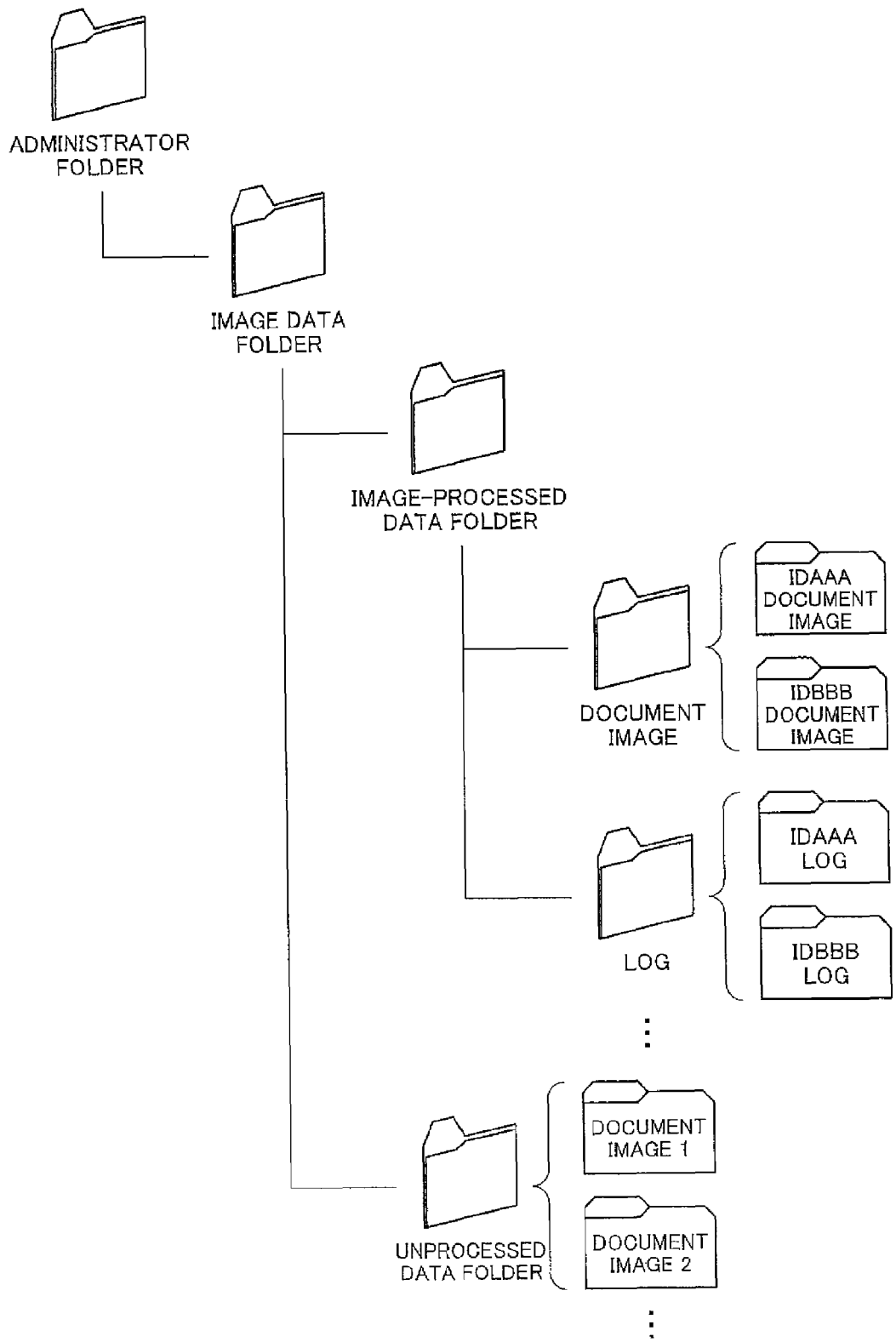
FIG. 14 is an explanatory drawing illustrating another example of a hierarchical structure of an administrator folder 8A in the image processing apparatus in FIG. 2.

Alternatively, as illustrated in FIG. 14, the present invention may be arranged so that an image folder in which image data is stored and a log folder in which a log is stored are provided in a lower hierarchy of the image-processed data folder, and the control section 7 changes the file name of image data to be stored and the file name of a log to be stored into file names (file names including user ID) corresponding to user information and stores the image data and the log in the image folder and the log folder, respectively.

As described above, the digital color multi-function printer 1 of the present embodiment determines similarity between input image data and a reference image, and when determining that there is similarity between the input image data and the reference image, the digital color multi-function printer 1 stores the input image data (or encoded image data) in the administrator folder 8A.

Consequently, an administrator can easily judge whether the result of the similarity determination is appropriate or not by accessing the administrator folder 8A and checking the input image data (or encoded image data). The administrator can make an action according to whether the result of the similarity determination is appropriate or not, i.e. an action such as changing the threshold value TH2 regarding similarity determination in order to reduce wrong determination. Furthermore, unlike the technique of Patent Document 5, the digital color multi-function printer 1 of the present invention does not require a paper output tray with a covered lock mechanism, a switching mechanism for switching carrying routes of a recording paper, etc. Consequently, it is possible to realize an image forming apparatus that allows the administrator to easily check whether the result of the similarity determination is appropriate or not without a larger and more complex structure and without an increase in costs.

Furthermore, in a case where it is determined that similarity exists as a result of similarity determination, the control section 7 asks the user whether the user requests continuation of the image process or not. When the user requests continuation of the image process, the control section 7 stores information for specifying the user and a log regarding the input image data in the administrator folder 8A, and permits the image process. Consequently, the administrator can specify the input image data subjected to the image process and the user who caused the image process to be performed on the input image data.

Furthermore, the control section 7 stores user information regarding a user who is permitted to continue the image process in a case where it is determined that similarity exists. In a case where it is determined that similarity exists, when the user requests continuation of the image process, the control section 7 judges whether to permit continuation of the image process or not by performing user authentication. Consequently, the user permitted to perform the image process on input image data that is determined as having similarity is limited to a specific user. This ensures higher security.

Furthermore, when storing image data that is determined as having similarity, image data on which the image process was performed and image data on which the image process was not performed are stored in respective folders. This allows the administrator to promptly specify the image data on which the image process was performed.

Furthermore, when storing the image data on which the image process was performed, the file name of the image data is changed to the file name corresponding to user information and is stored. This allows the administrator to promptly specify the user who caused the image process to be performed on the image data.

In the present embodiment, an explanation was made as to a case where, when it is determined that similarity exists as a result of similarity determination, input image data (or encoded image data) is stored in the administrator folder 8A.

However, the present invention is not limited to this case. For example, the present invention may be arranged so that a threshold value (second threshold value) TH2 for similarity determination and a threshold value (first threshold value) TH1 for judging whether to store input image data in the administrator folder 8A or not are different from each other.

Figure 15:
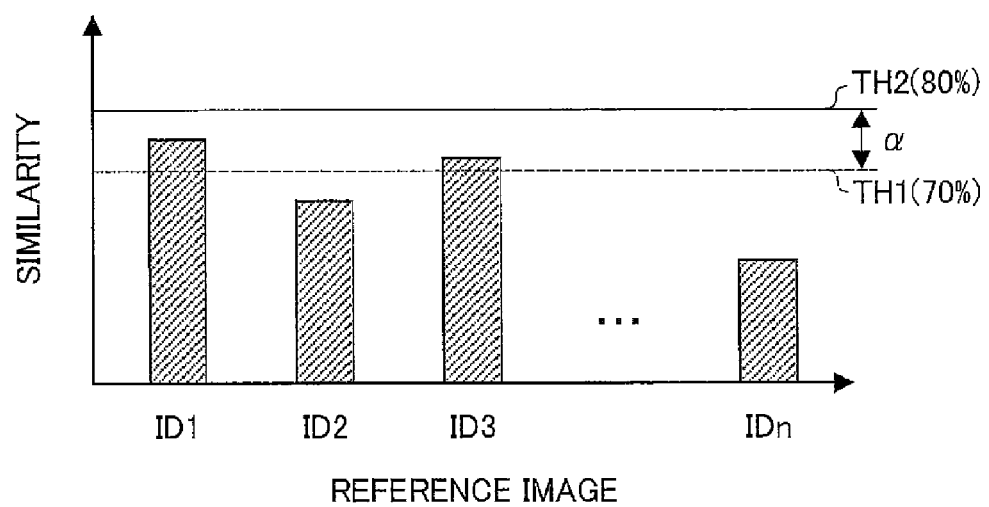
FIG. 15 is an explanatory drawing illustrating examples of a threshold value for similarity determination and a threshold value for determining whether to store input image data in an administrator folder or not in the image processing apparatus in FIG. 2, in a case where the threshold values are different from each other.

FIG. 15 is an explanatory drawing illustrating an example of a relation between the threshold value (second threshold value) TH2 for similarity determination with respect to similarity of each reference image calculated by the voting process section 33 (e.g. ratio of number of votes obtained for each reference image to total number of feature points of each reference image) and the threshold value (first threshold value) TH1 for judging whether to store the input image data in the administrator folder 8A or not. In the example of FIG. 15, the second threshold value TH2 is set to 80% and the first threshold value TH1 is set to 70%.

Consequently, as illustrated in FIG. 15, when the similarity is not less than 70% and less than 80% (not less than the first threshold value TH1 and less than the second threshold value TH2), the control section 7 permits the image process (copy, printing, transmission, editing, etc.) and causes the input image data (or encoded image data) to be stored in the administrator folder 8A. As a result, it is possible to store, in the administrator folder 8A, input image data that has been determined as not being similar but that has relatively high similarity and that may be a reference image (input image data that may be wrongly determined as not being similar in spite of being image data of a reference image in reality). Therefore, it is possible for the administrator to judge whether the result of similarity determination is appropriate or not afterward.

In the present embodiment, in the case where it is determined that similarity exists, when the user requests continuation of the image process, the control section 7 permits continuation of the image process on condition that input image data, a user ID, and a log are stored in the administrator folder 8A. Alternatively, the present invention may be arranged so that a third threshold value TH3 (e.g. 90%) larger than the second threshold value TH2 (e.g. 80%) for similarity determination is set, and when the similarity is not less than the second threshold value TH2 and less than the third threshold value TH3 and when the user requests continuation of the image process, the control section 7 permits continuation of the image process, and when the similarity is not less than the third threshold value TH3, the control section 7 prohibits (or limits) continuation of the image process regardless of the request from the user.

Consequently, when the similarity is not less than the third threshold value TH3, the possibility of wrong determination is low. Therefore, it is possible to prohibit (limit) continuation of the image process regardless of the request from the user, thereby ensuring higher security.

Furthermore, when the similarity is not less than the second threshold value TH2 and less than the third threshold value TH3, there is a possibility that input image data that is not image data of a reference image was wrongly determined as having similarity. Therefore, when the user requests continuation of the image process, continuation of the image process is permitted on condition that the input image data, user information, and a log are stored in the administrator folder 8A. This prevents wrong determination from delaying the process, and allows specifying the user having performed the image process and the input image data afterward. This ensures minimum security.

When input image data whose number of obtained votes (similarity) is less than the second threshold value TH2 and is not less than the first threshold value TH1 is stored in the administrator folder 8A, the input image data may be stored in the unprocessed data folder illustrated in FIG. 13 or 14 together with input image data whose number of votes is not less than the second threshold value TH2 or may be stored in a folder other than the unprocessed data folder.

Furthermore, in the present embodiment, an explanation was made as to a case where the present invention is applied to the digital color multi-function printer 1. However, the present invention is not limited to this case. For example, the present invention is applicable to a monochrome multi-function printer. Furthermore, in addition to the monochrome multi-function printer, the present invention is applicable to a single-function apparatus such as a facsimile, a copier, and an image reading apparatus.

Figure 16:
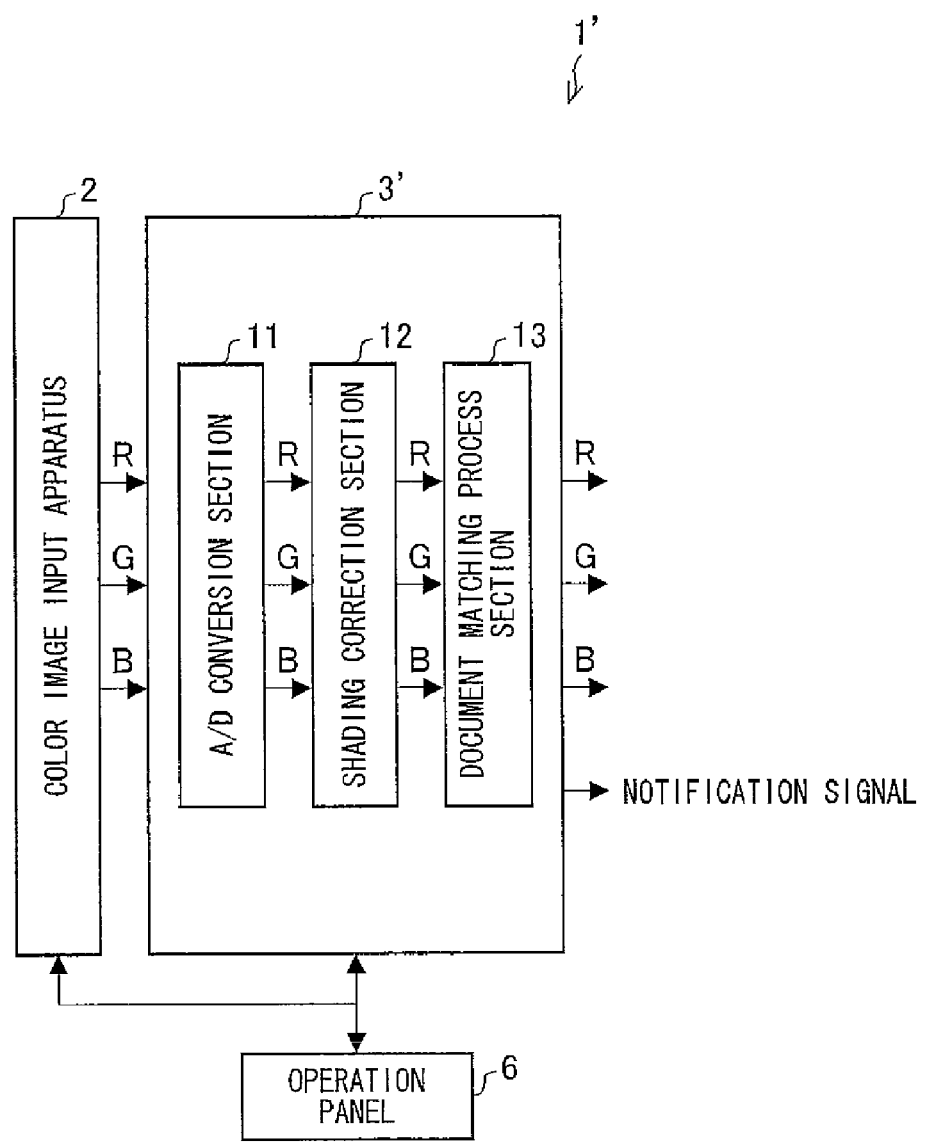
FIG. 16 is a block diagram illustrating a modification example of an image processing apparatus in accordance with an embodiment of the present invention.

FIG. 16 is a block diagram illustrating an example of a structure in a case where the present invention is applied to a flat bed scanner (image reading apparatus, image processing apparatus) 1'.

As illustrated in FIG. 16, the flat bed scanner 1' includes a color image input apparatus 2 and a color image processing apparatus 3'. The color image processing apparatus 3' includes an A/D conversion section 11, a shading correction section 12, a document matching process section 13, a control section 7 (not shown in FIG. 16), and a memory 8 (not shown in FIG. 16). The color image input apparatus 2 is connected with the color image processing apparatus 3', and the color image input apparatus 2 and the color image processing apparatus 3' constitute the image reading apparatus 1' as a whole. Functions of the A/D conversion section 11, the shading correction section 12, the document matching process section 13, the control section 7, and the memory 8 included in the color image input apparatus (image reading means) 2 are the same as those of the members in the digital color multi-function printer 1 as described above and explanations thereof are omitted here.

In the present embodiment, an explanation was made as to a case where the administrator folder 8A is included in the digital color multi-function printer 1. However, the present invention is not limited to this case. For example, the administrator folder 8A may be provided in an external device (such as server) communicably connected with the digital color multi-function printer 1.

Figure 17:
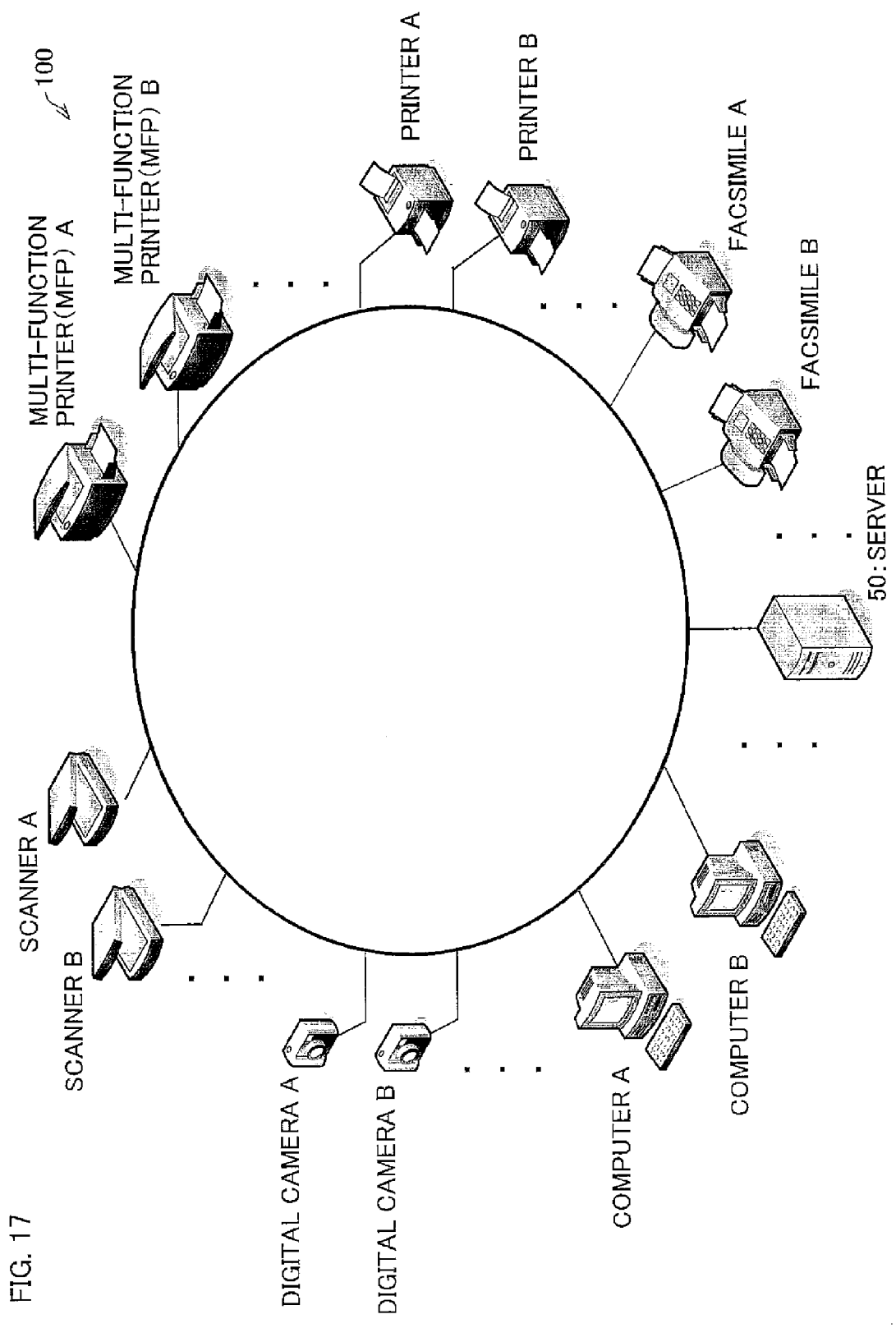
FIG. 17 is an explanatory drawing illustrating a structure of an image processing system in accordance with an embodiment of the present invention.

FIG. 17 is an explanatory drawing illustrating a structure of an image processing system 100 including: a server 50 having the administrator folder 8A; multi-function printers (MFPs) A, B, . . . ; printers A, B, facsimiles A, B, . . . ; computers A, B, . . . ; digital cameras A, B, . . . ; and scanners A, B, . . . that are communicably connected with the server 50 via a network. The structure of the image processing system 100 is not limited to this. For example, the image processing system 100 may include the server 50 and at least one of a multi-function printer, a printer (image forming apparatus), a facsimile, a computer, a digital camera (image reading apparatus), and a scanner (image reading apparatus).

The scanner includes a scanner platen, an optical scanning section, CCD (charge coupled device) etc. The scanner scans a document image on the scanner platen with use of the optical scanning section, thereby reading the document image and forming image data. The digital camera includes an image-capture lens, a CCD (image input device) etc. The digital camera captures a document image, a person image, a landscape image etc. and generates image data. The scanner and the digital camera may have a function for performing a predetermined image process (such as various correction processes) in order to reproduce an image suitably. The printer prints on a sheet (recording paper) an image according to image data generated by the computer, the scanner, and the digital camera. The facsimile performs a process such as a binary process, a resolution conversion process, and rotation on image data supplied from the image input device to obtain image data encoded into a predetermined format and sends the image data to the other end, or the facsimile receives image data from the other end, decodes the image data, performs a rotation process, a resolution conversion process, and a halftone process on the image data in accordance with performance of an image output device, and outputs the image data as an image per page. The multi-function printer includes at least two functions out of a scanner function, a facsimile transmission function, and a printing function (copy function, printer function). The computer edits image data read by the scanner and the digital camera, or generates a document with use of application software.

Each of the devices connected with the server 50 via a network includes a control section 7 and a document matching process section 13. In a case where it is determined that similarity exists (input image data is identical with image data of a reference image) as a result of similarity determination, the control section 7 causes input image data, device ID (information for specifying a device that transmits input image data to the server 50) etc. to be transmitted to the server 50, and a control section (not shown) of the server 50 stores received information in the administrator folder 8A provided in the server 50. In the case where it is determined that similarity exists, when the user requests continuation of the process and when continuation of the process is permitted as a result of user authentication, the control section 7 causes a log regarding the input image data, the device ID etc. to be transmitted to the server 50, and the control section (not shown) of the server 50 stores received information in the administrator folder 8A provided in the server 50.

In the present embodiment, an explanation was made as to a case where the similarity determination process is performed in the document matching process section 13 provided in the digital color multi-function printer 1. However, the present invention is not limited to this case. For example, a part of or all of the functions of the control section 7 and the document matching process section 13 may be performed in an external device communicably connected with the digital color multi-function printer 1.

Figure 18:
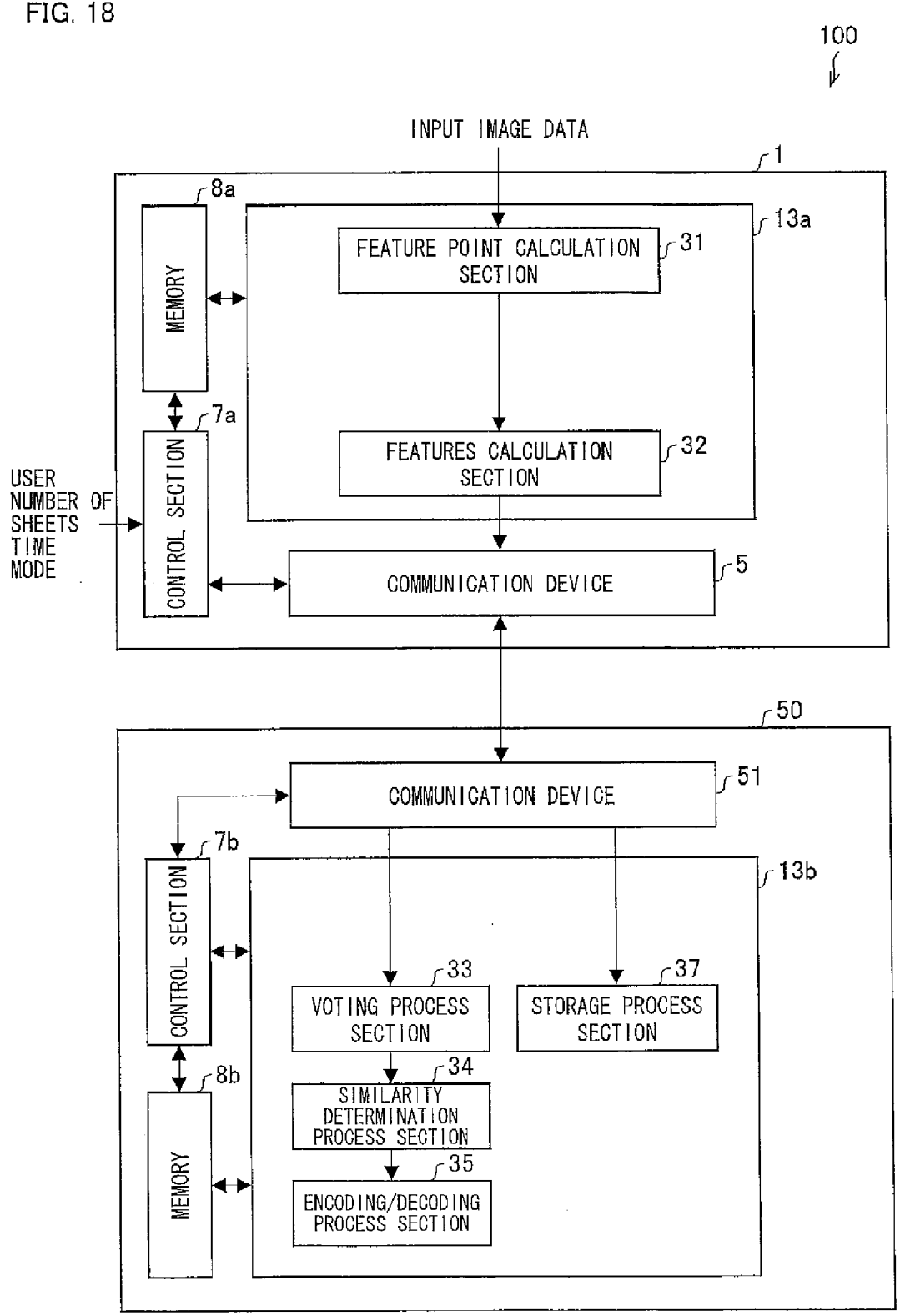
FIG. 18 is a block diagram illustrating an example of a structure of an image processing system in accordance with an embodiment of the present invention.
Figure 19:
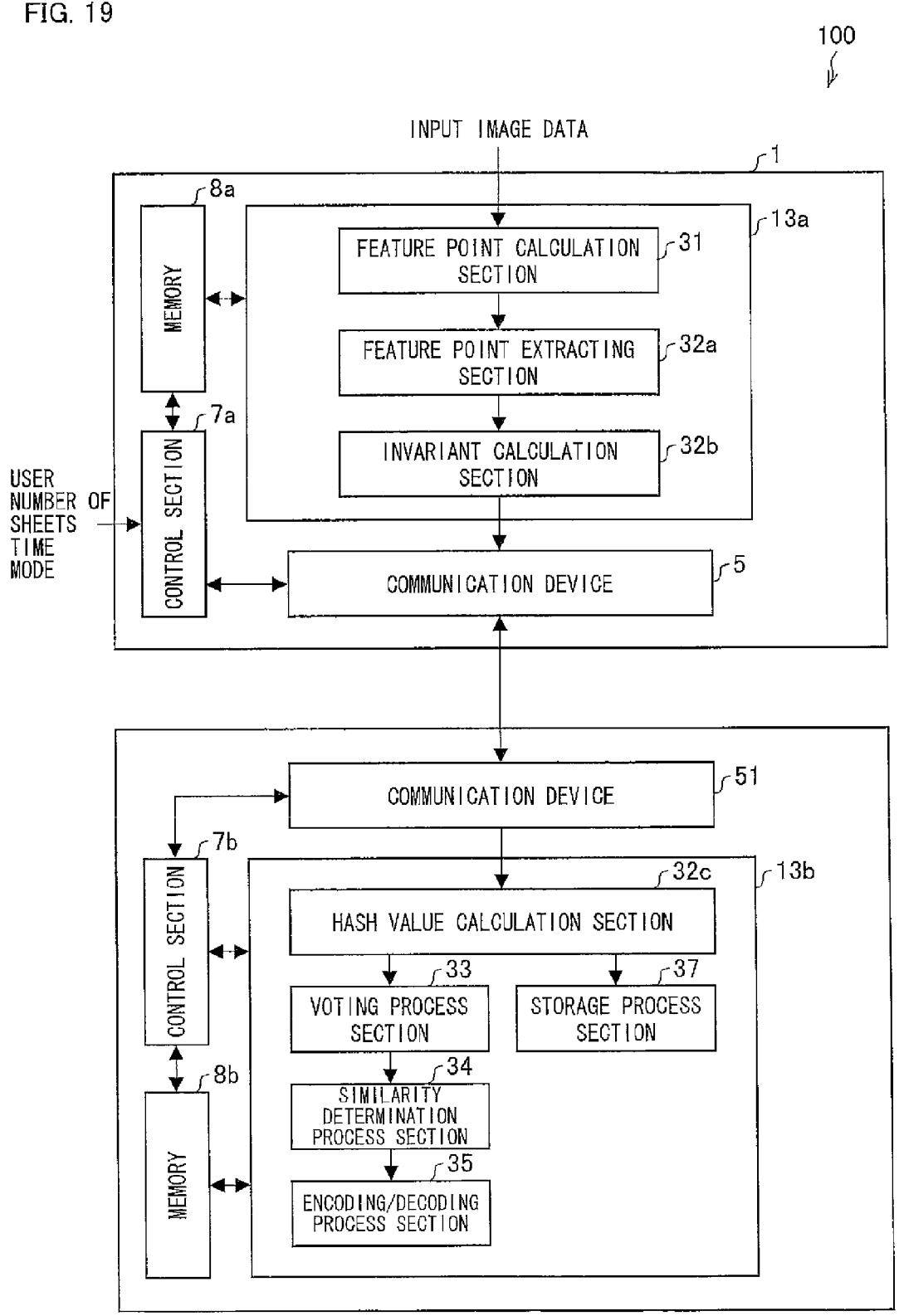
FIG. 19 is a block diagram illustrating another structure example of an image processing system in accordance with an embodiment of the present invention.
Figure 20:
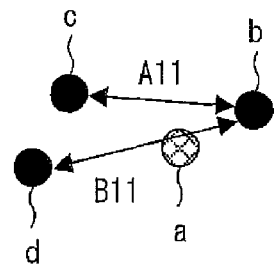
FIGS. 20($a$) to 20($d$) are explanatory drawings each illustrating an example of a combination of a target feature point and a peripheral feature point that are extracted at a time when the features calculation section in the image processing apparatus in accordance with an embodiment of the present invention calculates features.
Figure 20:
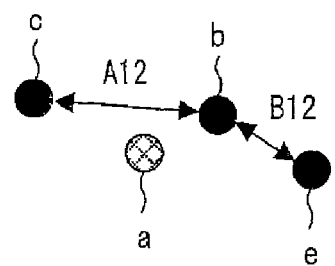
Figure 20:
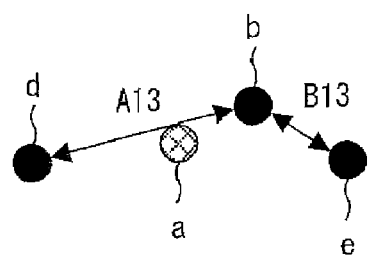
Figure 20:
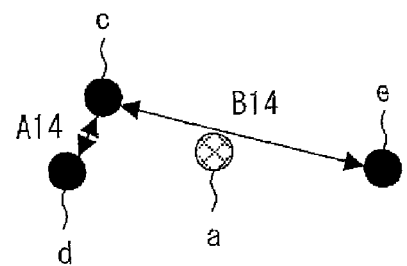
Figure 21:
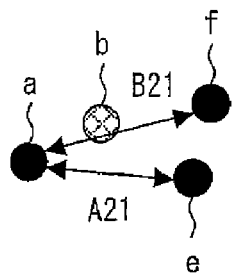
FIGS. 21(a) to 21(d) are explanatory drawings each illustrating an example of a combination of a target feature point and a peripheral feature point that are extracted at a time when the features calculation section in the image processing apparatus in accordance with an embodiment of the present invention calculates features.
Figure 21:
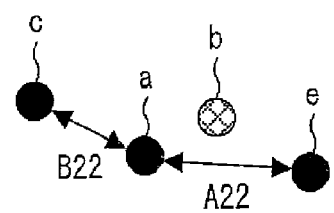
Figure 21:
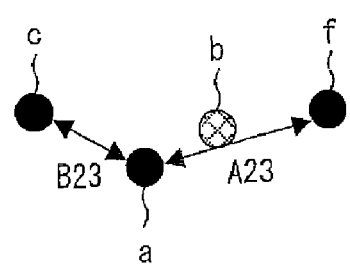
Figure 21:
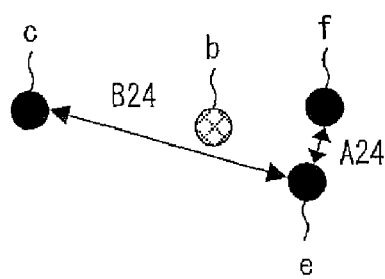

FIG. 18 is a block diagram illustrating an example of a structure in a case where a part of the functions of the control section 7 and the document matching process section 13 is included in the server 50.

As illustrated in FIG. 18, the color image processing apparatus 3 of the digital color multi-function printer 1 includes: a document matching process section 13a including a feature point calculation section 31 and a features calculation section 32; a control section 7a for controlling the operation of the document matching process section 13a; a memory 8a in which information necessary for the process of the document matching process section 13a is stored; and a communication device 5 for communicating with an external device. The server 50 includes: a communication device 51 for communicating with an external device; a document matching process section 13b including a voting process section 33, a similarity determination process section 34, an encoding/decoding process section 35, and a storage process section 37; a control section 7b for controlling the document matching process section 13b; and a memory 8b in which information necessary for the process of the document matching process section 13b is stored. In a case where transmission/reception of data is required between functional blocks of the digital color multi-function printer 1 and functional blocks of the server 50, the control sections 7a and 7b control the communication devices 5 and 51, respectively, so that transmission/reception of data is performed suitably. Other functions are the same as those already explained above.

In the example of FIG. 18, all members of the features calculation section 32 (feature point extracting section 32a, invariant calculation section 32b, and hash value calculation section 32c) are included in the digital color multi-function printer 1. Alternatively, the present invention may be arranged so that the feature point extracting section 32a and the invariant calculation section 32b are provided in the digital color multi-function printer 1 and the hash value calculation section 32c is provided in the server 50.

Alternatively, the present invention may be arranged so that members of the features calculation section 32 are provided in the server 50, data indicative of a feature point calculated by the feature point calculation section 31 is transmitted from the digital color multi-function printer 1 to the server 50, and the features calculation section 32 provided in the server 50 calculates a hash value based on the hash table 103 stored in the memory 8b and the received data indicative of the feature point. Alternatively, the present invention may be arranged so that members of the feature point calculation section 31 and the features calculation section 32 are provided in the server 50, input image data is transmitted from the digital color multi-function printer 1 to the server 50, and the feature point calculation section 31 and the features calculation section 32 calculate a hash value based on the input image data received from the server 50 and the hash table 103 stored in the memory 8b.

The above explanation was made as to a case of performing the similarity determination process. In a case of performing the storage process, the storage process section 37 provided in the server 50 registers, in the hash table 103 provided in the memory 8b, a document ID received from the digital color multi-function printer 1 and a hash value received from the digital color multi-function printer 1 (or a hash value calculated by the hash value calculation section 32c provided in the server 50). Whether to perform the similarity determination process or the storage process may be determined in such a manner that a user of the digital color multi-function printer 1 designates one of the processes via the operation panel 6 and a signal indicative of the designated process is sent to the server 50. Alternatively, the server 50 may perform the storage process on an input image which the server 50 has determined has no similarity as a result of the similarity determination process.

In the case where the hash value calculation section 32c is provided in the server 50, the present invention may be arranged so that a hash value is calculated through a method different from the method for calculating hash values stored in the hash table 103 (calculated using a different hash function), and the hash table 103 is updated using the calculated hash value. Consequently, a suitable hash value obtained by referring to features (invariant) in accordance with the kind etc. of the document image can be stored (updated) in the hash table 103, allowing the voting process using the stored hash value. This allows an increase in matching accuracy (accuracy in similarity determination).

Furthermore, in the present embodiment, input image data is stored in the administrator folder 8A when it is determined that similarity exists as a result of similarity determination. In addition, text information extracted from the input image data through an OCR (Optical Character Recognition) process may be stored in the administrator folder 8A. At that time, the digital color multi-function printer 1 is provided with an OCR process section for extracting text information (text data)

from the input image data, and the control section 7 stores the text data extracted by the OCR process section in the administrator folder 8A.

Embodiment 2

The following explains another embodiment of the present invention. For convenience of explanation, members having the same functions as those in Embodiment 1 are given the same reference numerals and explanations thereof are omitted here.

Figure 22:
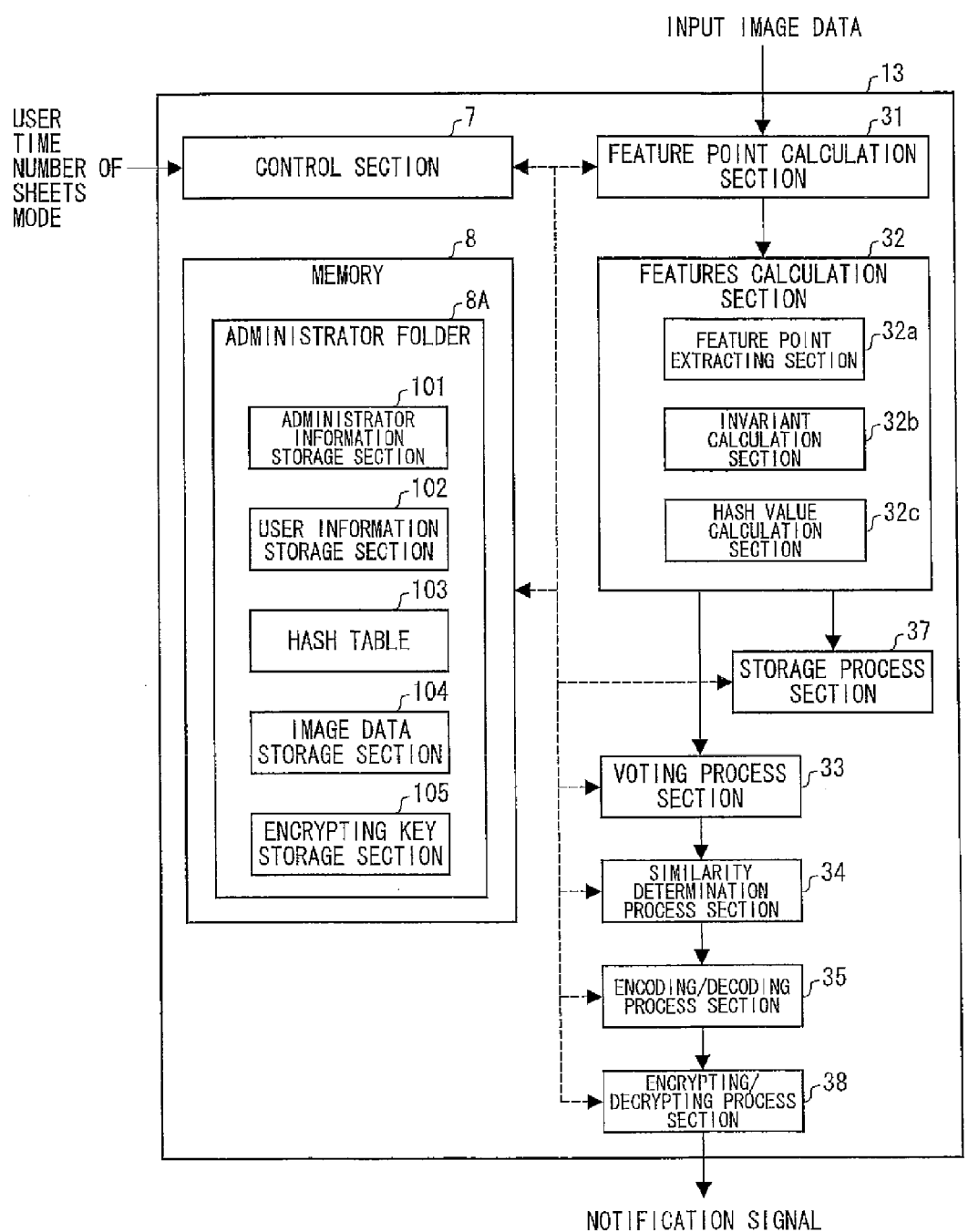
FIG. 22 is a block diagram schematically illustrating a structure of an image processing apparatus in accordance with another embodiment of the present invention.

FIG. 22 is a block diagram schematically illustrating a structure of a digital color multi-function printer (image processing apparatus, image forming apparatus, image reading apparatus) 1. As illustrated in FIG. 22, the digital color multi-function printer 1 of the present embodiment is the same as the digital color multi-function printer 1 of Embodiment 1 except that the digital color multi-function printer 1 of the present embodiment further includes an encrypting/decrypting process section 38 in the document matching process section 13 and an encrypting key storage section 105 in the administrator folder 8A.

The encrypting/decrypting process section 38 encrypts image data encoded in the encoding/decoding process section 35 and stores the encrypted image data in the image data storage section 104 in the administrator folder SA. Furthermore, the encrypting/decrypting process section 38 decrypts encrypted image data stored in the image data storage section 104, decodes the decrypted encoded image, and outputs the decoded image to the input tone correction section 14.

The encrypting key storage section 105 stores and manages (records) an encrypting key for decrypting image data encrypted by the encrypting/decrypting process section 38 in such a manner that the encrypting key is related to the encrypted image data. In the present embodiment, when the encrypting/decrypting process section 38 encrypts image data, the encrypting/decrypting process section 38 assigns a unique value serving as an encrypting key to each image data, and stores the encrypting key and the image data in the encrypting key storage section 105 in such a manner that the encrypting key and the image data are related to each other. When decrypting the image data, the encrypting/decrypting process section 38 reads the encrypting key corresponding to the image data to be decrypted, from the encrypting key storage section 105, and performs decrypting.

FIG. 23 is a flowchart illustrating a flow of a process in the digital color multi-function printer 1.

Initially, when the control section 7 receives an instruction input (image process request) from a user via the operation panel 6 or the communication device 5, the control section 7 resets number-of-times Cp user information to be stored in the memory 8 is input (Cp=0) (S21).

Next, the control section 7 acquires input image data (S22). For example, the control section 7 may acquire input image data by the color image input apparatus 2 reading a document image, or by the communication device 5 obtaining input image data from an external device, or by reading input image data from various storage media via a card reader (not shown) included in the digital color multi-function printer 1.

Next, the control section 7 controls sections of the document matching process section 13 so that the sections carry out a feature point calculation process (S23), a features calculation process (S24), a voting process (S25), and a similarity determination process (S26).

In a case where it is determined that no similarity exists as a result of the similarity determination process, the control section 7 permits an image process (e.g. image formation by the color image output apparatus 4, transmission to the outside via the communication device 5 etc.) according to a process request from the user (S27), and finishes the process.

On the other hand, in a case where it is determined that similarity exists as a result of the similarity determination process, the control section 7 causes the encoding/decoding process section 35 to encode input image data and generate encoded image data (S28). Then, the control section 7 causes the encrypting/decrypting process section 38 to encrypt the encoded image data thus generated so as to generate encrypted image data (S29), and causes information that associates the encrypted image data with the encrypting key (information indicative of a relation between the encrypted image data and the encrypting key) to be stored (registered) in the encrypting key storage section 105 (S30). Further, the control section 7 causes the encrypted image data generated in S29 to be stored in the image data storage section 104 in the administrator folder 8A (S31).

In the present embodiment, input image data is encoded and then the encoded image data is encrypted. Alternatively, the input image data may be directly encrypted, or the input image data may be encoded and encrypted simultaneously.

Furthermore, a method for encrypting image data is not particularly limited and may be one of conventional publicly known methods. For example, Data Encryption Standard or Advanced Encryption Standard etc. that is a general common key code may be used. Furthermore, a method for allowing only a specific user to decrypt a file may be used. At that time, public key cryptography such as RSA public key cryptography may be used. In a case of ensuring further safety for data, an encrypting method disclosed in Patent Document 6 (Japanese Unexamined Patent Publication No. 2006-203824 (published on Aug. 3, 2006) for example may be used. In the method, an encrypting key is an expiration key, and even when the encrypting key is published to a user, the encrypting key cannot be used for decrypting after a predetermined time.

Furthermore, the control section 7 causes the display section of the operation panel 6 to display a message that an image process requested by the user is not permitted and a question whether the user requests continuation of the image process or not (S32). At that time, the display section may display a message that continuation of the image process requires user authentication and that user information and a log are recorded (alternatively, user information and a log are notified to an administrator (notification signal in FIG. 1 is output)).

Next, the control section 7 judges whether the user requests continuation of the image process or not according to user's input via the operation panel 6 (S33). When the control section 7 judges that the user does not request continuation of the image process, the control section 7 finishes the process.

On the other hand, when the control section 7 judges that the user requests continuation of the image process, the control section 7 causes the display section of the operation panel 6 to display a message for urging the user to enter user information (user ID and password), and acquires user information entered by the user (S34). Here, an explanation is made as to a case where the user enters the user ID and the password as the user information via the operation panel 6. However, the present invention is not limited to this case and may be arranged so that the control section 7 reads out user information from a personal card inserted into a card reader (not shown) included in the digital color multi-function printer 1. Furthermore, the present invention may be arranged so that, when a process request comes from an external device (such as computer) communicably connected with the digital color multi-function printer 1, the control section 7 transmits, to the external device, a signal for requesting transmission of user information and acquires the user information sent from the external device.

Next, the control section 7 compares the obtained user information with user information stored in the user information storage section 102, and performs an authentication process for judging whether the user is permitted to continue the image process or not (S35).

When the obtained user information does not match user information stored in the user information storage section 102 (authentication failure), the control section 7 increments the value of Cp by 1 (Cp=Cp+1) (S36), and judges whether Cp>K or not (S37). When Cp>K, the control section 7 does not permit continuation of the image process (S38), and finishes the process. On the other hand, when Cp≦K, the control section 7 causes the process to go back to S34 and accepts input of the user information again.

In S35, when it is judged that the user information obtained in S34 is identical with user information stored in the user information storage section 102 (authentication success), the control section 7 causes the encrypting/decrypting process section 38 to decrypt the encrypted image data stored in the image data storage section 104 (S39), and causes the encoding/decoding process section 35 to decode the encoded image data thus decrypted (S40). Then, the control section 7 permits continuation of the image process (S41), stores the input image data (or encoded image data) and a log regarding the input image data in the administrator folder 8A (S42), and finishes the process.

In the example of FIG. 23, decrypting of encrypted image data is carried out in the digital color multi-function printer 1. Alternatively, the present invention may be arranged so that encrypted image data is sent to an external device via the communication device 5 and the external device acquires an encrypting key from the digital color multi-function printer 1 and decrypts the encrypted image data. FIG. 24 is a flowchart illustrating a flow of the process in this case.

Initially, the control section 7 acquires an image transmission request from a user and input image data via the operation panel 6 or the communication device 5 (S51). For example, the control section 7 may acquire input image data by the color image input apparatus 2 reading a document image, or by the communication device 5 obtaining input image data from an external device, or by reading input image data from various storage media via a card reader (not shown) included in the digital color multi-function printer 1.

Next, the control section 7 controls sections of the document matching process section 13 so that the sections carry out a feature point calculation process (S52), a features calculation process (S53), a voting process (S54), and a similarity determination process (S55).

In a case where it is determined that no similarity exists as a result of the similarity determination process, the control section 7 causes the encoding/decoding process section 35 to encode input image data to generate encoded image data (S56), transmits via the communication device 5 the encoded image data thus generated to an external device designated by the image transmission request (S57), and finishes the process. Consequently, the external device decodes the received encoded image data, thereby obtaining the input image data.

On the other hand, in a case where it is determined that similarity exists as a result of the similarity determination process, the control section 7 causes the encoding/decoding process section 35 to encode input image data so as to generate encoded image data (S58). Then, the control section 7 causes the encrypting/decrypting process section 38 to encrypt the encoded image data thus generated so as to generate encrypted image data (S59), and causes information that associates the encrypted image data with the encrypting key (information indicative of a relation between the encrypted image data and the encrypting key) to be stored (registered) in the encrypting key storage section 105 (S60). Further, the control section 7 causes the encrypted image data generated in S59 to be stored in the image data storage section 104 in the administrator folder 8A (S61).

Next, the control section 7 transmits the encrypted image data and reference information regarding an encrypting key for decrypting the encrypted image data (information indicative of where to make reference as to a decrypting method), to the external device designated by the image transmission request, via the communication device 5 (S62). For example, when transmitting an image via e-mail, where to make reference may be described in the e-mail, or an image file and a text file with reference information may be packed with each other and be sent.

Thereafter, the control section 7 monitors whether a reference regarding the encrypting key comes from the external device or not (S63). When the reference comes, the control section 7 judges whether to permit use of the input image data or not (S64). The judgment may be performed based on a result of user authentication or a result of authentication by the external device, etc. or may be performed by an administrator individually.

When permitting use of the input image data, the control section 7 stores reference information and a log in the administrator folder 8A, reads the encrypting key corresponding to the input image data from the encrypting key storage section 105, transmits the encrypting key to the external device via the communication device 5 (S65), and finishes the process. Consequently, the external device can receive the encrypted image data transmitted in S62 and the encrypting key transmitted in S65 and can decrypt the encrypted image data in accordance with the encrypting key. Then, by decoding the encoded image data obtained by the decrypting, the original input image data can be obtained.

On the other hand, when not permitting use of the input image data, the control section 7 transmits, via the communication device 5 to the external device, a message that the use of the input image data is not permitted (S66), and finishes the process.

As described above, in the present embodiment, when it is determined that a document of input image data is similar to a document of a reference image, the input image data or encoded image data obtained by encoding the input image data is encrypted by the encrypting/decrypting process section 38 and is stored in the administrator folder 8A.

Consequently, it is possible to ensure higher security for the input image data. For example, even when the memory 8 in which the administrator folder 8A is provided is illegally brought out through physical means, it is possible to prevent illegal use of the input image data or leakage of the input image data. The present invention may be arranged so that the encrypting key storage section 105 in which the encrypting key is stored and the image data storage section 104 in which the encrypted image data is stored are provided in different memories (hardware), respectively. This ensures further higher security for the encrypted image data.

In the arrangement of Embodiment 1, image data having high similarity to a reference image (important image data (important document)) is stored in the administrator folder (access limitation storage section) 8A. Consequently, when the memory 8 (e.g. storage device such as hard disc) in which the administrator folder 8A is stored is brought out physically, it is impossible to prevent leakage of information similar to the reference image (important image data). That is, since the image having high similarity to the important document is stored in the administrator folder 8A, there is a high risk that the information is stolen together. In contrast, in the arrangement of the present embodiment, since image data is encrypted and stored in the administrator folder 8A, even when the memory 8 in which the administrator folder 8A is stored is stolen physically, it is possible to prevent leakage of information.

Furthermore, in the present embodiment, a unique value is assigned to each image data as an encrypting key for decrypting encrypted image data, and the value is stored and managed in the encrypting key storage section 105 in such a manner that the value is related to target image data. This allows suitable decrypting with use of the encrypting key in a case where the image process on input image data is permitted. Furthermore, it is possible to present the encrypting key to a user, allowing the user to decrypt encrypted image data. Consequently, for example, when a user requesting an output of encrypted image data goes through a formal procedure and obtains permission from the administrator, it is possible to issue an encrypting key for decrypting the encrypted image data to the user and to permit the user to output the image data. Furthermore, it is possible to permit decrypting of encrypted image data without waiting for permission of the administrator, on condition that pre-registered personal information (ID) etc. is entered.

In each of the above embodiments, each section (each block) constituting the document matching process section and the control section included in the digital color multi-function printer 1 and/or the server 50 may be realized by software by using a processor such as a CPU. Namely, the digital color multi-function printer 1 and/or the server 50 include: a CPU (central processing unit) for executing a control program for realizing each function; a ROM (read only memory) that stores the program; a RAM (random access memory) that develops the program; a storage device (storage medium) such as a memory in which the program and various data are stored; and the like. The object of the present invention can be realized in such a manner that the digital color multi-function printer 1 and/or the server 50 are provided with a computer-readable storage medium for storing program codes (such as executable program, intermediate code program, and source program) of control programs of the digital color multi-function printer 1 and/or the server 50 which programs serve as software for realizing the functions, and a computer (alternatively, CPU or MPU) reads out and executes the program codes stored in the storage medium.

The storage medium is, for example, tapes such as a magnetic tape and a cassette tape, or discs such as magnetic discs (e.g. a Floppy Disc® and a hard disc), and optical discs (e.g. CD-ROM, MO, MD, DVD, and CD-R). Further, the storage medium may be cards such as an IC card (including a memory card) and an optical card, or semiconductor memories such as mask ROM, EPROM, EEPROM, and flash ROM.

Further, the digital color multi-function printer 1 and/or the server 50 may be arranged so as to be connectable to a communication network so that the program code is supplied to the digital color multi-function printer 1 and/or the server 50 through the communication network. The communication network is not particularly limited. Examples of the communication network include the Internet, intranet, extranet, LAN, ISDN, VAN, CATV communication network, virtual private network, telephone network, mobile communication network, and satellite communication network. Further, a transmission medium that constitutes the communication network is not particularly limited. Examples of the transmission medium include (i) wired lines such as IEEE 1394, USB, power-line carrier, cable TV lines, telephone lines, and ADSL lines and (ii) wireless connections such as IrDA and remote control using infrared ray, Bluetooth®, 802.11, HDR, mobile phone network, satellite connections, and terrestrial digital network. Note that the present invention can be also realized by the program codes in the form of a computer data signal embedded in a carrier wave, which is the program that is electrically transmitted.

Furthermore, each block of the digital color multi-function printer 1 and/or the server 50 may be realized by hardware logic. Each block of the digital color multi-function printer 1 and/or the server 50 may be a combination of hardware carrying out some of the processes and the computing means controlling the hardware and executing program code for the other processes.

The computer system of the present invention may be composed of: an image input apparatus such as a flat bed scanner, a film scanner, and a digital camera; a computer loaded with a predetermined program to execute processes such as the similarity calculation process and the similarity determination process; an image display apparatus, such as a CRT display and a liquid crystal display, for displaying a result of the process by the computer; and an image forming apparatus, such as a printer, for outputting a result of the process by the computer on a paper etc. Furthermore, a network card or a modem may be provided as communication means for connecting a server etc. via a network.

As described above, the image processing apparatus of the present invention is an image processing apparatus, including: an input data obtaining section for obtaining input image data; a features extracting section for extracting features of the input image data; at least one of a storage section in which features of a reference image are stored and a reference image obtaining section for obtaining features of a reference image from an external device communicably connected with the image processing apparatus; a similarity calculation section for comparing the features of the input image data with the features of the reference image so as to calculate similarity between the input image data and the reference image; and a control section for controlling a process on the input image data in accordance with the similarity, the control section causing the input image data or encoded image data obtained by encoding the input image data to be stored in an access limitation storage section to which only a specific user is accessible, in a case where the similarity calculated by the similarity calculation section is not less than a predetermined first threshold value. The input data obtaining section may acquire input image data by a scanner reading a document, may acquire input image data generated by entering necessary information in a format of electronic data with use of software, may acquire input image data directly generated as electronic data, and may acquire input image data transmitted from a device communicably connected with the image processing apparatus.

With the arrangement, the image processing apparatus of the present invention includes at least one of the storage section in which features of a reference image are stored and the reference image obtaining section for obtaining features of a reference image from an external device communicably connected with the image processing apparatus. The features extracting section extracts the features of input image data, and the similarity calculation section compares the features of the reference image read out from the storage section or the features of the reference image obtained by the reference image obtaining section with the features of the input image data extracted by the features extracting section so as to calculate similarity between the reference image and the input image data. In the case where the similarity calculated by the similarity calculation section is not less than the predetermined first threshold value, the control section causes the input image data or encoded image data obtained by encoding the input image data to be stored in the access limitation storage section to which a specific user is accessible.

Thus, the input image data whose similarity to the reference image is not less than the first threshold value or the encoded image data thereof is stored in the access limitation storage section. Consequently, the specific user can easily check whether a result of similarity determination is appropriate or not by seeing the input image data or the encoded image data stored in the access limitation storage section. Furthermore, since only the control section and the access limitation storage section are required, it is unnecessary to provide a paper output tray having a covered lock mechanism and a switching mechanism for switching carrying routes of a recording paper that are described in Patent Document 5. Therefore, it is possible to realize an apparatus that allows a user to easily check whether the result of the similarity determination is appropriate or not, without requiring a larger and more complex structure and an increase in costs. Furthermore, the present invention is applicable not only to an arrangement in which an image corresponding to input image data is formed on a printing material but also to an arrangement in which input image data is electronically distributed, facsimiled, or filed etc.

Furthermore, the image processing apparatus of the present invention may be arranged so as to further include a process input section which a request for a process on the input image data is input to, the control section prohibiting or limiting execution of the process on the input image data, in a case where the similarity is not less than a second threshold value that is predetermined to be not less than the first threshold value, and the control section permitting execution of the process on the input image data, in a case where the similarity is not less than the first threshold value and less than the second threshold value.

With the arrangement, it is possible to prohibit or limit execution of the input image data with a high possibility of being image data of a reference image. This ensures higher security for the reference image.

The second threshold value may be equal to the first threshold value or may be larger than the first threshold value. When the second threshold value is larger than the first threshold value, input image data whose similarity is more than the first threshold value and less than the second threshold value is permitted to be processed without any restriction or limitation, and the input image data or encoded image data thereof is stored in the access limitation storage section. This allows preventing delay in a process that is caused by wrongly determining image data as image data of a reference image, and allows the specific user to check whether the result of the determination is appropriate or not by seeing the input image data or the encoded image data that may be wrongly determined as the image data of the reference image.

Further, the image processing apparatus of the present invention may be arranged so as to further include a user information storage section in which user information for specifying a user permitted to execute the process on the input image data even in a case where the similarity is not less than the second threshold value is stored, in the case where the similarity is not less than the second threshold value, the control section receiving an input of user information via the process input section, and determining whether user information identical with the user information input from the process input section exists in the user information storage section, and when the identical user information exists, the control section causing the input image data or the encoded image data to be stored in the access limitation storage section in such a manner that the input image data or the encoded image data is related to the user information, and the control section permitting execution of the process on the input image data.

With the arrangement, in a case where the similarity calculated by the similarity calculation section is not less than the second threshold value, when user information entered via the process input section is identical with user information that is stored beforehand in the user information storage section as user information of a user permitted to execute a process, execution of the process on the input image data is permitted on condition that the input image data or encoded image data thereof and the user information are stored in the access limitation storage section. This allows the process on the input image data even when it is determined that the input image data is identical with the image data of the reference image. Consequently, it is possible to prevent delay in the process that is caused by wrong determination. Furthermore, in a case where it is determined that the input image data is identical with the image data of the reference image and execution of the process is permitted, the input image data or the encoded image data thereof is stored in the access limitation storage section so that the specific user can check the result of the determination afterward and specify the user having executed the process, this ensures higher security for the reference image.

Furthermore, the image processing apparatus of the present invention may be arranged so as to further include a display section for displaying information to a user, in the case where the similarity is not less than the second threshold value, the control section causing the display section to display a message for urging the user to enter an instruction on whether to request execution of the process on the input image data or not, and when the user enters a request to execute the process to the process input section, the control section causing the display section to display a message for urging the user to enter user information.

With the arrangement, in the case where it is determined that the input image data is identical with the image data of the reference image, it is possible to cause the display section to display information for urging the user to enter instructions as an operation that can be selected by the user. This increases convenience for the user.

Furthermore, the image processing apparatus of the present invention may be arranged so as to further include a log generating section for generating log information regarding the input image data, the control section causing the input image data or the encoded image data, the user information, and the log information to be stored in the access limitation storage section in such a manner that the input image data or the encoded image data, the user information, and the log are related to one another.

With the arrangement, in the case where it is determined that the input image data is identical with the image data of the reference image, when execution of the process is permitted, the log information regarding the input image data as well as the input image data or the encoded image data thereof and the user information are stored in the access limitation storage section. This allows the specific user to check whether the result of the determination is appropriate or not and to check the log information regarding the input image data.

The image processing apparatus of the present invention may be arranged so that the access limitation storage section includes a first storage region and a second storage region, and in the case where the similarity is not less than the second threshold value, the control section causes input image data having been unprocessed or encoded image data obtained by encoding the unprocessed image data to be stored in the first storage region, and the control section causes input image data having been processed or encoded image data obtained by encoding the processed image data to be stored in the second storage region.

With the arrangement, in the case where it is determined that the input image data is identical with the image data of the reference image, the processed input image data or the encoded image data thereof or the unprocessed input image data or the encoded image data thereof are stored in different storage regions, respectively. Therefore, it is possible for the specific user to promptly specify the processed input image data or the encoded image data thereof and check it.

The image processing apparatus of the present invention may be arranged so that the control section causes input image data having been processed or encoded image data obtained by encoding the processed input image data to be stored in the access limitation storage section in such a manner that user information is added to the processed input image data or the encoded image data or in such a manner that a file name including the user information is added to the processed input image data or the encoded image data.

With the arrangement, it is possible for the specific user to promptly specify a user having executed the process on the input image data.

The image processing apparatus of the present invention may be arranged so that in a case where the similarity is not less than the second threshold value and less than a third threshold value that is predetermined to be larger than the second threshold value, when user information identical with the user information input from the process input section exists in the user information storage section, the control section causes the input image data or the encoded image data to be stored in the access limitation storage section in such a manner that the input image data or the encoded image data is related to the identical user information, and the control section permits execution of the process on the input image data, and in a case where the similarity is not less than the third threshold value, the control section prohibits execution of the process on the input image data.

With the arrangement, in the case where it is determined that the input image data is identical with the image data of the reference image, when the similarity calculated by the similarity calculation section is not less than the second threshold value and less than the third threshold value, it is possible to carry out the process on the input image data, which prevents delay in the process due to wrong determination. Furthermore, in the case where it is determined that the input image data is identical with the image data of the reference image, when execution of the process is permitted, the input image data or the encoded image data thereof is stored in the access limitation storage section so that the specific user can check the result of the determination afterward, and can specify a user having executed the process. This ensures security for the reference image. Furthermore, when the similarity calculated by the similarity calculation section is not less than the third threshold value, it is highly possible that the determination is not wrong (it is highly possible that the determination that the input image data is identical with the image data of the reference image is appropriate). Therefore, the process on the input image data is prohibited. This allows preventing the process from being carried out on the reference image.

Furthermore, the image processing apparatus of the present invention may be arranged so as to further include an encrypting section for generating encrypted image data obtained by encrypting the input image data or the encoded image data, in the case where the similarity is not less than the predetermined first threshold value, the control section causing the encrypted image data to be stored in the access limitation storage section.

With the arrangement, the input image data or the encoded image data is encrypted and stored. This ensures higher security for the input image data.

The image processing apparatus of the present invention may be arranged so as to further include an encrypting key storage section in which encrypting key information for decrypting the encrypted image data is stored in such a manner that the encrypting key information is related to the encrypted image data.

With the arrangement, the encrypted image data is properly decrypted if necessary.

Furthermore, the image processing apparatus of the present invention may be arranged so as to further include a communication section for transmitting image data to the external device, when the control section causes the communication section to transmit the encrypted image data to the external device and then receives a request for transmitting an encrypting key corresponding to the encrypted image data from the external device, the control section causing the communication section to transmit the encrypting key to the external device.

With the arrangement, a time to transmit the encrypted image data and a time to transmit the encrypting key are different. Consequently, it is possible to reduce a risk that the input image data is illegally leaked out via a communication route, thereby ensuring higher security for the input image data.

The image forming apparatus of the present invention includes: one of the above image processing apparatuses; and an image output section for forming an image corresponding to input image data on a printing material.

With the image forming apparatus, the input image data whose similarity to the reference image is not less than the first threshold value or encoded image data thereof is stored in the access limitation storage section. Consequently, the specific user can easily check whether a result of the similarity determination is appropriate or not by seeing the input image data or the encoded image data stored in the access limitation storage section.

The image processing method of the present invention is an image processing method, including the steps of: (i) obtaining input image data; (ii) extracting features of the input image data; (iii) obtaining features of a reference image; and (iv) comparing the features of the input image data with the features of the reference image so as to calculate similarity between the input image data and the reference image, a process on the input image data being controlled in accordance with the similarity, the image processing method further including the steps of: (v) determining whether the similarity calculated in the step (iv) is not less than a predetermined first threshold value or not; and (vi) causing the input image data or encoded image data obtained by encoding the input image data to be stored in an access limitation storage section to which only a specific user is accessible, in a case where it is determined in the step (v) that the similarity is not less than the first threshold value.

With the method, the features of the input image data that are obtained in the step (i) are extracted in the step (ii), and the features of the reference image are obtained in the step (iii).

Furthermore, the features of the input image data are compared with the features of the reference image in the step (iv) so as to calculate similarity between the input image data and the reference image. Subsequently, it is determined in the step (v) whether the similarity calculated in the step (iv) is not less than the predetermined first threshold value or not in the step (v). In a case where it is determined in the step (v) that the similarity is not less than the first threshold value, the input image data or the encoded image data obtained by encoding the input image data is stored in the access limitation storage section to which only a specific user is accessible in the step (vi).

Consequently, the input image data whose similarity to the reference image is not less than the first threshold value or the encoded image data thereof is stored in the access limitation storage section. Therefore, the specific user can check whether a result of the similarity determination is appropriate or not by seeing the input image data or the encoded image data stored in the access limitation storage section.

In order to solve the foregoing problem, the image processing system of the present invention is an image processing system, including an image processing apparatus and a server communicably connected with the image processing apparatus, one or both of the image processing apparatus and the server including: an input data obtaining section for obtaining input image data; a features extracting section for extracting features of the input image data; a storage section in which features of a reference image are stored; a similarity calculation section for comparing the features of the input image data with the features of the reference image so as to calculate similarity between the input image data and the reference image; a control section for controlling a process on the input image data in accordance with the similarity; and an access limitation storage section to which only a specific use is accessible, in a case where the similarity calculated by the similarity calculation section is not less than a predetermined first threshold value, the control section causing the input image data or encoded image data obtained by encoding the input image data to be stored in the access limitation storage section.

With the arrangement, the input image data whose similarity to the reference image is not less than the first threshold value or the encoded image data thereof is stored in the access limitation storage section. Consequently, the specific user can easily check whether a result of similarity determination is appropriate or not by seeing the input image data or the encoded image data stored in the access limitation storage section. Furthermore, since only the control section and the access limitation storage section are required, it is unnecessary to provide a paper output tray having a covered lock mechanism and a switching mechanism for switching carrying routes of a recording paper that are described in Patent Document 5. Therefore, it is possible to realize an apparatus that allows a user to easily check whether the result of the similarity determination is appropriate or not, without requiring a larger and more complex structure and an increase in costs. Furthermore, the present invention is applicable not only to an arrangement in which an image corresponding to input image data is formed on a printing material but also to an arrangement in which input image data is electronically distributed, facsimiled, or filed etc.

Furthermore, the image processing system of the present invention may be arranged so as to further include an encrypting section for generating encrypted image data obtained by encrypting the input image data or the encoded image data, in the case where the similarity is not less than the predetermined first threshold value, the control section causing the encrypted image data to be stored in the access limitation storage section.

With the arrangement, the input image data or the encoded image data is encrypted and stored. This ensures higher security for the input image data.

The image processing system of the present invention may be arranged so as to further include an encrypting key storage section in which encrypting key information for decrypting the encrypted image data is stored in such a manner that the encrypting key information is related to the encrypted image data.

With the arrangement, the encrypted image data is properly decrypted if necessary.

The image processing system of the present invention may be arranged so that when the control section causes the encrypted image data to be transmitted from one of the image processing apparatus and the server that includes the access limitation storage section to the other of the image processing apparatus and the server and then receives a request for transmitting an encrypting key corresponding to the encrypted image data from said the other, the control section causing the encrypting key to be transmitted to said the other.

With the arrangement, a time to transmit the encrypted image data and a time to transmit the encrypting key are different. Consequently, it is possible to reduce a risk that the input image data is illegally leaked out via a communication route, thereby ensuring higher security for the input image data.

The image processing apparatus may be realized by a computer. In this case, the present invention also includes: an image processing program for causing the computer to function as each of the above sections so as to realize the image processing apparatus; and a computer-readable storage medium in which the program is stored.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An image processing apparatus, comprising:
an input data obtaining section for obtaining input image data;
a features extracting section for extracting features of the input image data;
at least one of a storage section in which features of a reference image are stored and a reference image obtaining section for obtaining features of a reference image from an external device communicably connected with the image processing apparatus;
a similarity calculation section for comparing the features of the input image data with the features of the reference image so as to calculate similarity between the input image data and the reference image; and
a control section for controlling a process on the input image data in accordance with the similarity,
the control section causing the input image data or encoded image data obtained by encoding the input image data to be stored in an access limitation storage section to which only a specific user is accessible, in a case where the similarity calculated by the similarity calculation section is not less than a predetermined first threshold value,
a process input section which a request for a process on the input image data is input to, the control section prohibiting or limiting execution of the process on the input image data, in a case where the similarity is not less than a second threshold value that is predetermined to be not less than the first threshold value, and the control section permitting execution of the process on the input image data, in a case where the similarity is not less than the first threshold value and less than the second threshold value.

2. The image processing apparatus as set forth in claim 1, further comprising a user information storage section in which user information for specifying a user permitted to execute the process on the input image data even in a case where the similarity is not less than the second threshold value is stored, in the case where the similarity is not less than the second threshold value, the control section receiving an input of user information from the process input section, and determining whether user information identical with the user information input from the process input section exists in the user information storage section, and when the identical user information exists, the control section causing the input image data or the encoded image data to be stored in the access limitation storage section in such a manner that the input image data or the encoded image data is related to the user information, and the control section permitting execution of the process on the input image data.

3. The image processing apparatus as set forth in claim 2, further comprising a display section for displaying information to a user, in the case where the similarity is not less than the second threshold value, the control section causing the display section to display a message for urging the user to enter an instruction on whether to request execution of the process on the input image data or not, and when the user enters a request to execute the process from the process input section, the control section causing the display section to display a message for urging the user to enter user information.

4. The image processing apparatus as set forth in claim 2, further comprising a log generating section for generating log information regarding the input image data, the control section causing the input image data or the encoded image data, the user information, and the log information to be stored in the access limitation storage section in such a manner that the input image data or the encoded image data, the user information, and the log are related to one another.

5. The image processing apparatus as set forth in claim 2, wherein the access limitation storage section includes a first storage region and a second storage region, and in the case where the similarity is not less than the second threshold value, the control section causes input image data having been unprocessed or encoded image data obtained by encoding the unprocessed image data to be stored in the first storage region, and the control section causes input image data having been processed or encoded image data obtained by encoding the processed image data to be stored in the second storage region.

6. The image processing apparatus as set forth in claim 2, wherein the control section causes input image data having been processed or encoded image data obtained by encoding the processed input image data to be stored in the access limitation storage section in such a manner that user information is added to the processed input image data or the encoded image data or in such a manner that a file name including the user information is added to the processed input image data or the encoded image data.

7. The image processing apparatus as set forth in claim 2, wherein in a case where the similarity is not less than the second threshold value and less than a third threshold value that is predetermined to be larger than the second threshold value, when user information identical with the user information input from the process input section exists in the user information storage section, the control section causes the input image data or the encoded image data to be stored in the access limitation storage section in such a manner that the input image data or the encoded image data is related to the identical user information, and the control section permits execution of the process on the input image data, and in a case where the similarity is not less than the third threshold value, the control section prohibits execution of the process on the input image data.

8. The image processing apparatus as set forth in claim 1, further comprising an encrypting section for generating encrypted image data obtained by encrypting the input image data or the encoded image data, in the case where the similarity is not less than the predetermined first threshold value, the control section causing the encrypted image data to be stored in the access limitation storage section.

9. The image processing apparatus as set forth in claim 8, further comprising an encrypting key storage section in which encrypting key information for decrypting the encrypted image data is stored in such a manner that the encrypting key information is related to the encrypted image data.

10. The image processing apparatus as set forth in claim 9, further comprising a communication section for transmitting image data to the external device, when the control section causes the communication section to transmit the encrypted image data to the external device and then receives a request for transmitting an encrypting key corresponding to the encrypted image data from the external device, the control section causing the communication section to transmit the encrypting key to the external device.

11. An image forming apparatus, comprising: an image processing apparatus as set forth in claim 1; and an image output section for forming an image corresponding to input image data on a printing material.

12. A non-transitory computer-readable storage medium in which a program for causing an image processing apparatus as set forth in claim 1 to operate is stored, the program causing a computer to operate as each section of the image processing apparatus.

13. An image processing method, comprising the steps of:
(i) obtaining input image data;
(ii) extracting features of the input image data;
(iii) obtaining features of a reference image; and
(iv) comparing the features of the input image data with the features of the reference image so as to calculate similarity between the input image data and the reference image, a process on the input image data being controlled in accordance with the similarity, the image processing method further comprising the steps of:
(v) determining whether the similarity calculated in the step (iv) is not less than a predetermined first threshold value or not; and (vi) causing the input image data or encoded image data obtained by encoding the input image data to be stored in an access limitation storage section to which only a specific user is accessible, in a case where it is determined in the step (v) that the similarity is not less than the first threshold value, inputting a request for a process on the input image data, the process on the input image data being controlled by:

prohibiting or limiting execution of the process on the input image data, in a case where the similarity is not less than a second threshold value that is predetermined to be not less than the first threshold value, and permitting execution of the process on the input image data, in a case where the similarity is not less than the first threshold value and less than the second threshold value.

14. An image processing system, comprising an image processing apparatus and a server communicably connected with the image processing apparatus, there being provided: an input data obtaining section for obtaining input image data; a features extracting section for extracting features of the input image data; a storage section in which features of a reference image are stored; a similarity calculation section for comparing the features of the input image data with the features of the reference image so as to calculate similarity between the input image data and the reference image; a control section for controlling a process on the input image data in accordance with the similarity; and an access limitation storage section to which only a specific user is accessible, the input data obtaining section, the features extracting section, the storage section, the similarity calculation section, the control section, and the access limitation storage section being divided into the image processing apparatus and the server, in a case where the similarity calculated by the similarity calculation section is not less than a predetermined first threshold value, the control section causing the input image data or encoded image data obtained by encoding the input image data to be stored in the access limitation storage section, a process input section which a request for a process on the input image data is input to, the control section prohibiting or limiting execution of the process on the input image data, in a case where the similarity is not less than a second threshold value that is predetermined to be not less than the first threshold value, and the control section permitting execution of the process on the input image data, in a case where the similarity is not less than the first threshold value and less than the second threshold value.

15. The image processing system as set forth in claim 14, further comprising an encrypting section for generating encrypted image data obtained by encrypting the input image data or the encoded image data, in the case where the similarity is not less than the predetermined first threshold value, the control section causing the encrypted image data to be stored in the access limitation storage section.

16. The image processing system as set forth in claim 15, further comprising an encrypting key storage section in which encrypting key information for decrypting the encrypted image data is stored in such a manner that the encrypting key information is related to the encrypted image data.

17. The image processing system as set forth in claim 16, when the control section causes the encrypted image data to be transmitted from one of the image processing apparatus and the server that includes the access limitation storage section to another apparatus and then receives a request for transmitting an encrypting key corresponding to the encrypted image data from said another apparatus, the control section causing the encrypting key to be transmitted to said another apparatus.

* * * * *